(12) United States Patent
Fiorentini et al.

(10) Patent No.: US 12,107,399 B2
(45) Date of Patent: Oct. 1, 2024

(54) CABLE PULLER ADAPTER FOR USE WITH A CABLE PULLER AND ITS METHOD OF USE

(71) Applicant: Greenlee Tools, Inc., Rockford, IL (US)

(72) Inventors: Henry Alexander Fiorentini, Rockford, IL (US); Anthony J. Bussan, Davis Junction, IL (US); Austin Thomas Peck, Rockford, IL (US); Eric Williams, Rockford, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 47 days.

(21) Appl. No.: 17/596,035

(22) PCT Filed: Jul. 1, 2020

(86) PCT No.: PCT/US2020/040433
§ 371 (c)(1),
(2) Date: Dec. 2, 2021

(87) PCT Pub. No.: WO2021/003225
PCT Pub. Date: Jan. 7, 2021

(65) Prior Publication Data
US 2022/0329053 A1 Oct. 13, 2022

Related U.S. Application Data

(60) Provisional application No. 62/870,141, filed on Jul. 3, 2019.

(51) Int. Cl.
*H02G 1/00* (2006.01)
*H02G 1/08* (2006.01)

(52) U.S. Cl.
CPC .................................. *H02G 1/08* (2013.01)

(58) Field of Classification Search
CPC ....................................................... H02G 1/08
See application file for complete search history.

(56) References Cited

U.S. PATENT DOCUMENTS

| | | | |
|---|---|---|---|
| 3,120,043 A * | 2/1964 | Carl ...................... | F16G 11/103 254/371 |
| 4,561,580 A | 12/1985 | Trail, Jr. | |

(Continued)

FOREIGN PATENT DOCUMENTS

| | | |
|---|---|---|
| CN | 205603117 U | 9/2016 |
| WO | WO2015069194 A1 | 5/2015 |

OTHER PUBLICATIONS

"Aerial & Underground Cable Installation Equipment & Tools," Catalog Part No. CAT11-DON, Condux International Inc., MN, USA, www.condux.com, 2011, pp. 84-89.

(Continued)

*Primary Examiner* — Lee D Wilson
(74) *Attorney, Agent, or Firm* — Klintworth & Rozenblat IP LLP

(57) ABSTRACT

A cable puller adapter includes a rotatable gripping member which receives and guides a tailing portion of a pulling line coupled between a capstan of a cable puller and the gripping member, an adapter motor which applies torque to the gripping member, and a controller operatively coupled to the gripping member and configured to measure an amount of current drawn by or provided to the adapter motor, and configured to determine a rotational speed of the adapter motor or the gripping member. The controller adjusts a tailing force on a tailing portion of the pulling line by modulating an amount of current provided to the adapter motor, so as to maximize a velocity of the tailing portion of the pulling line as the gripping member rotates. A method of use is also provided.

33 Claims, 16 Drawing Sheets

(56) References Cited

U.S. PATENT DOCUMENTS

| | | | |
|---|---|---|---|
| 4,603,839 A | 8/1986 | Ekman et al. | |
| 6,457,666 B1 | 10/2002 | Neiderer | |
| 7,712,726 B1 * | 5/2010 | Jernigan | H02G 1/08 |
| | | | 254/134.3 R |
| 7,971,856 B2 * | 7/2011 | Kochan | D07B 5/006 |
| | | | 474/190 |
| 2009/0078921 A1 * | 3/2009 | Plummer | H02G 1/08 |
| | | | 254/134.3 R |
| 2015/0076266 A1 | 3/2015 | Crawford et al. | |
| 2016/0261097 A1 * | 9/2016 | Smith | H02G 1/08 |
| 2018/0191141 A1 * | 7/2018 | Schmidt | H02G 1/085 |
| 2020/0017338 A1 | 1/2020 | Hall et al. | |
| 2022/0329053 A1 * | 10/2022 | Fiorentini | H02G 1/08 |

OTHER PUBLICATIONS

Belegung Epic Climbing Assist Device.
English machine translation of CN205603117.
International Search Report for PCT/US2020/040433 dated Oct. 6, 2020.

* cited by examiner

CABLE PULLER ADAPTER FOR USE WITH A CABLE PULLER AND ITS METHOD OF USE

This application claims the domestic priority of U.S. Provisional Application Ser. No. 62/870,141, filed on Jul. 3, 2019, the contents of which are incorporated herein in its entirety.

FIELD OF THE DISCLOSURE

The present disclosure relates to a cable puller adapter and its method of use with a conventional cable puller to form a cable pulling system. The cable puller adapter is used to adjust the tailing force on a tail of a pulling line that is routed through the cable puller and the cable puller adapter.

BACKGROUND

High-force rope pulling is a commonly used technique in cable pulling operations, whereby a pulling line is attached to an electrical cable or wire that is to be pulled through conduit or along a cable tray by a cable puller. The conduit or cable tray may be any length and may contain any number of bends, turns, or other layout characteristics.

One end of the pulling line is connected to the object being pulled, while the other end of the pulling line is pulled by the cable puller. The pulling line is wound by an operator around a capstan on the cable puller leaving a free, loose end of the pulling line. The capstan is powered by a motor. As the motor turns the capstan, the friction of the pulling line on the capstan offloads most of the pulling force to the motor, requiring the operator to manually pull on the free, loose end of the pulling line to maintain friction of the pulling line on the capstan. This manually-applied force is called "tailing force", and the activity itself is simply called "tailing" the rope. Use of the cable puller to pull the electrical cable or wire through the conduit or along the cable tray allows the operator to exert only a small force on the pulling line that tails off of the capstan. This relatively small force is translated into a large force of several thousand pounds which is exerted on the incoming pulling line and which provides enough force on the pulling line and the electrical cable or wire to pull them through the conduit or along the cable tray. If no tailing force is provided, or if insufficient tailing force is provided, the pulling line will slip on the capstan, reducing the pull speed. If too much tailing force is provided, the pulling line binds up against itself and against the base of the capstan, which creates excessive friction and reduces the pull speed.

This process can require pull forces of up to 10,000 lbs., and tailing forces of up to 100 lbs., depending on the situation. These pulls can take anywhere from a few minutes to two hours, and it is common to do many pulls in one working day. The advantage of using a capstan (as opposed to a winch that spools up the pulling line) is that the operator can vary the force and speed of the pull by varying the tailing force. This is important because the electrical cable or wire can get stuck in the conduit or cable tray (either on an obstruction, or simply by going around a bend in the run) and the operator may need to reduce or completely release the force to prevent damage to the electrical cable or wire. A capstan also allows the operator to make fine adjustments to the pull force at any point in the operation by allowing the pulling line to slip on the capstan by varying amounts. When the pulling line is moving in synchronization with the capstan and not slipping, this is called "full engagement". Conversely, when the pulling line is completely slipping on the capstan and not moving with the capstan, this is called "no engagement".

Inconsistent tailing force and inconsistent pulling force and speed may arise when the operator manually provides the tailing force. One solution to these problems is called a "self-tailing" capstan, or a self-tailing "winch", which is commonly seen on large sailboats, as well as on some rope pulling machines designed for electrical applications. These self-tailing capstans use a pulley on the end of the capstan to grab the tail of the pulling line. In these applications, the pulley is physically connected to the capstan, which synchronizes its speed to that of the capstan. Since the pulley and capstan are synchronized in movement, the tailing force can only be adjusted by the operator removing the pulling line from the pulley and pulling on the tail manually, which undermines the value of the pulley.

SUMMARY

A cable puller adapter is used with a conventional cable puller and is used to adjust the tailing force on a tail of a pulling line that is routed through the cable puller and the cable puller adapter.

A cable puller adapter in accordance with some example embodiments includes an adapter frame, a rotatable gripping member mounted on the adapter frame and configured to receive and guide a tailing portion of the pulling line coupled between the capstan and the gripping member. And an adapter motor mounted on the adapter frame configured to apply torque to the gripping member.

A cable puller adapter in accordance with some example embodiments includes a rotatable gripping member configured to receive and guide a tailing portion of a pulling line coupled between a capstan of a cable puller and the gripping member, an adapter motor configured to apply torque to the gripping member, a controller operatively coupled to the gripping member, the controller configured to measure an amount of current drawn by or provided to the adapter motor, and configured to determine a rotational speed of the adapter motor or the gripping member, and the controller configured to adjust a tailing force on a tailing portion of the pulling line by modulating an amount of current provided to the adapter motor, so as to maximize a velocity of the tailing portion of the pulling line as the gripping member rotates.

A method for controlling a cable puller adapter in accordance with some example embodiments is provided. The cable puller adapter is arranged in operative engagement with a cable puller having a rotatable motor-driven capstan that provides a pulling force on a pulling line. The method includes determining an amount of tailing force on a tailing portion of the pulling line coupled between the capstan and a rotatable motor-driven gripping member of the cable puller adapter, determining a velocity of the tailing portion of the pulling line coupled between the capstan and the motor-driven gripping member, and continuously adjusting the tailing force applied to the tailing portion of the pulling line so as to maximize the velocity of the tailing portion of the pulling line as the motor-driven gripping member rotates.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
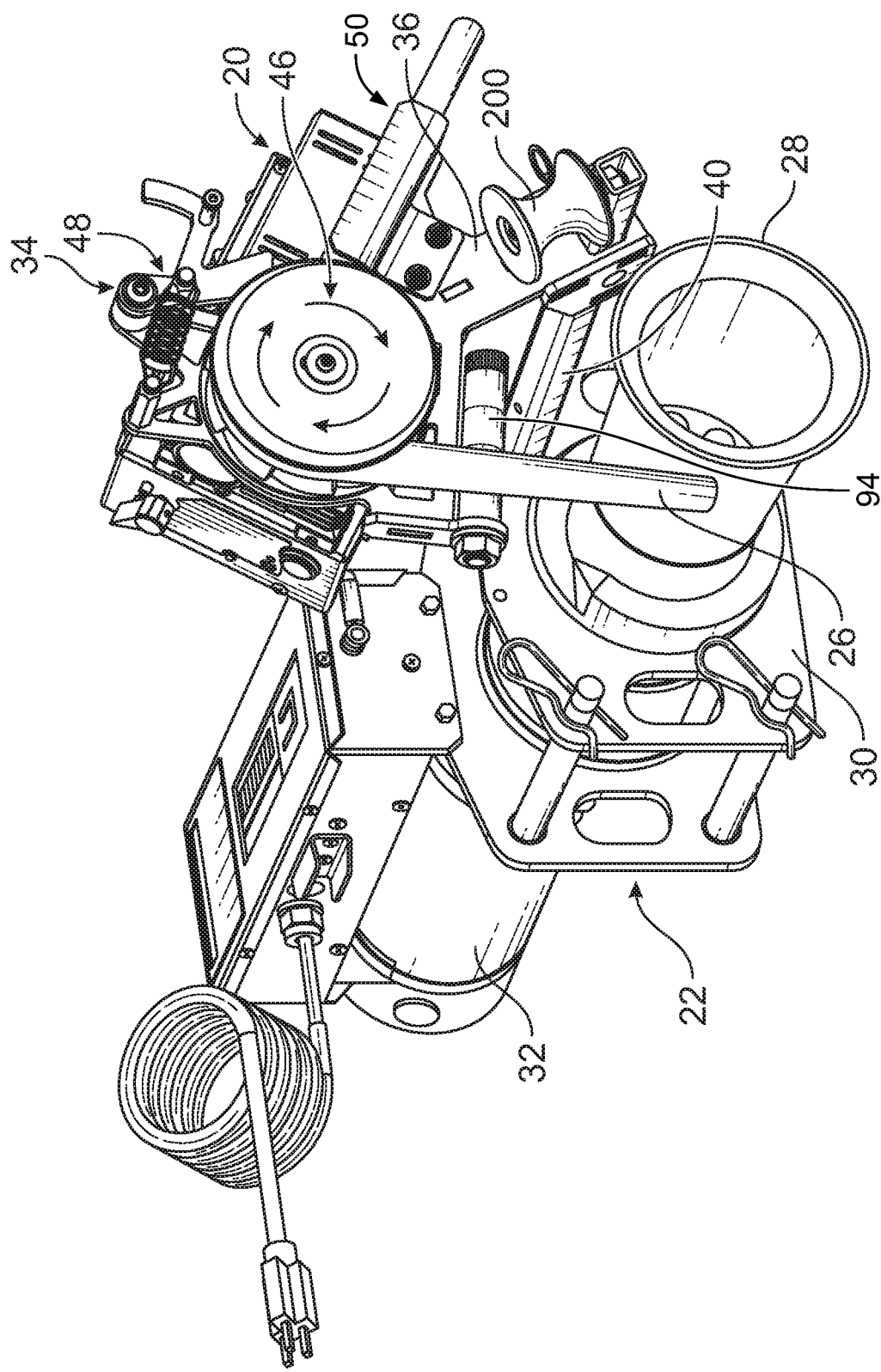
FIG. 1 depicts a perspective view of a cable pulling system which includes a conventional cable puller and a cable puller adapter, according to one embodiment.
Figure 2:
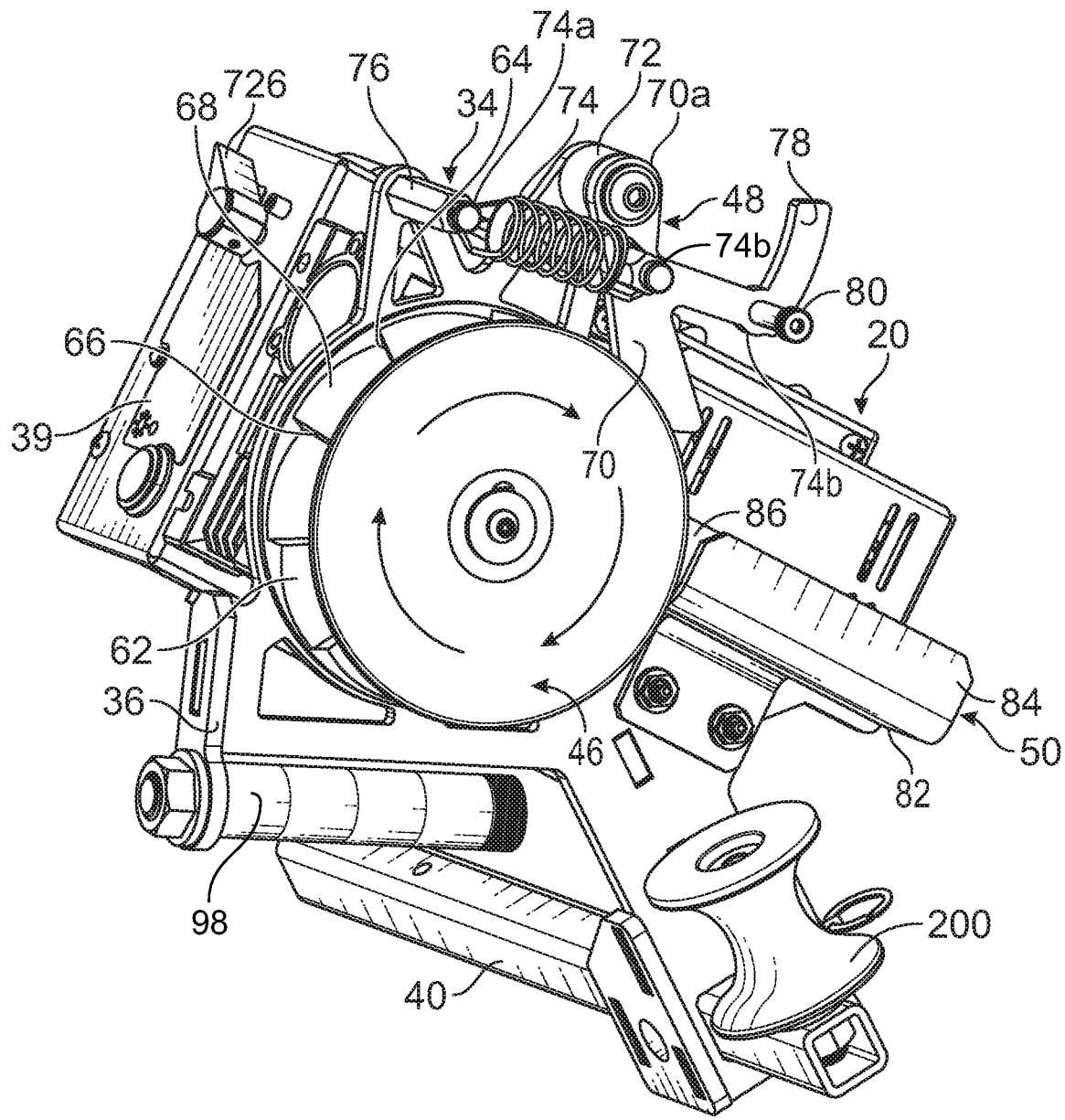
FIG. 2 depicts a perspective view of the cable puller adapter shown in FIG. 1.
Figure 3:
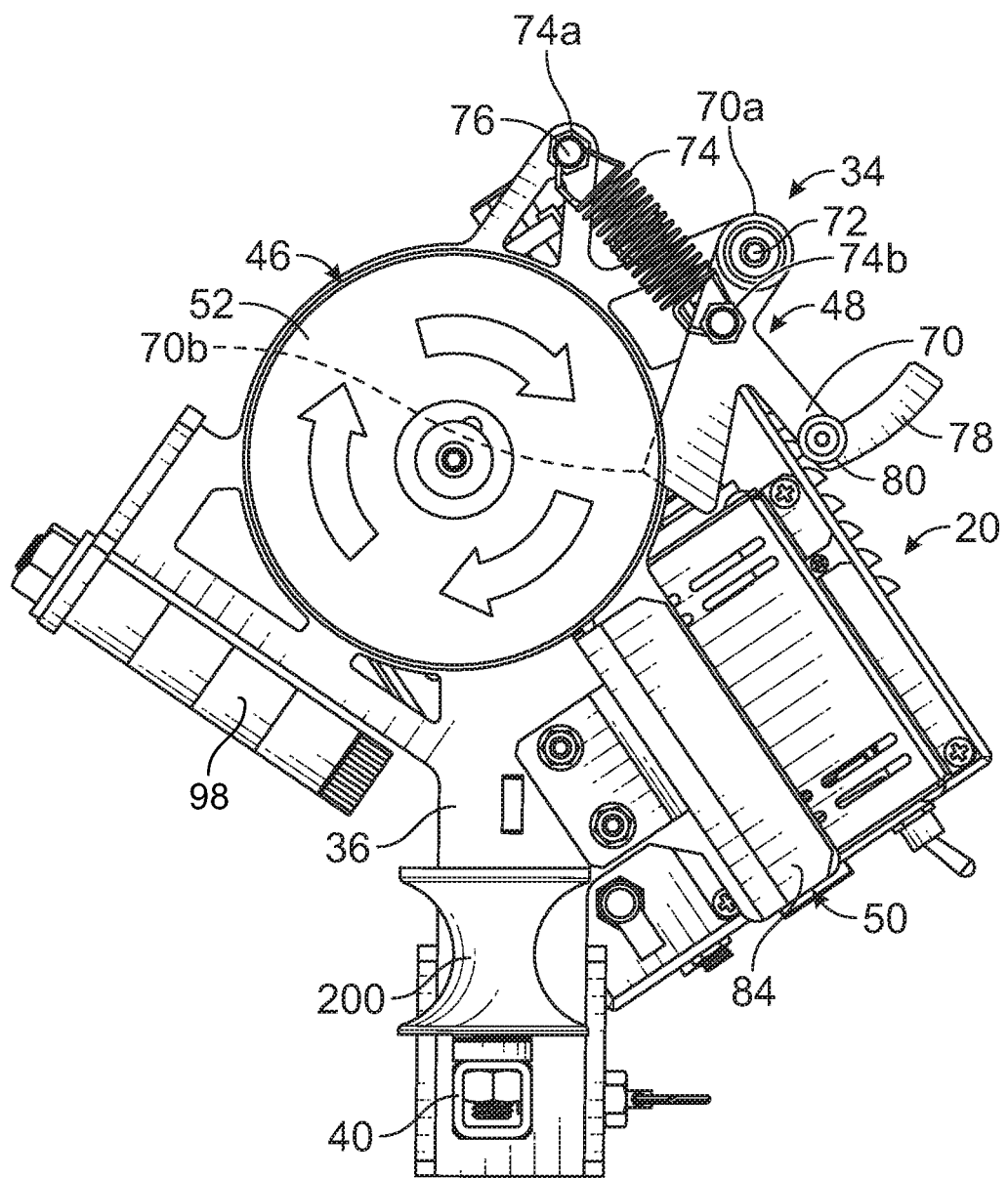
FIG. 3 depicts a side elevation view of the cable puller adapter shown in FIG. 1.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

A cable puller adapter 20, 120, 220, 320 is provided and is used with a conventional cable puller 22 to form a cable pulling system. The cable puller adapter 20, 120, 220, 320 is used to adjust the tailing force on a tail of a pulling line 26 that is routed through the cable puller 22 and the cable puller adapter 20, 120, 220, 320.

Cable pullers 22 are known in the art. Examples of suitable cable pullers 22 with which the cable puller adapter 20, 120, 220, 320 can be used are the Greenlee UT-10 and G6. The cable puller 22 may, for example, be mounted to the floor or may be mounted on a wheeled carriage. Cable pulling is a commonly used technique whereby the pulling line 26 is attached to an electrical cable or wire (not shown) that is to be pulled through conduit or along a cable tray by the cable puller 22. The conduit/cable tray may be any length and may contain any number of bends, turns, or other layout characteristics. The pulling line 26 is wound by an operator around a capstan 28 rotatably mounted on a cable puller housing 30 of the cable puller 22 and tails off the capstan 28. The capstan 28 is powered by a cable puller motor 32 mounted on the cable puller housing 30. The cable puller adapter 20, 120, 220, 320 of various embodiments provides optimal tailing force on the tail of the pulling line 26 which is translated into a large force of several thousand pounds which is exerted on the pulling line 26 incoming into the cable puller 22, and which provides enough force on the pulling line 26 and the electrical cable or wire to pull them through the conduit/cable tray.

The cable puller adapter 20, 120, 220, 320 includes a rotatable tailing mechanism 34, 134, 234, 334 mounted on an adapter frame 36, 136, 236, 336, and an adapter motor 38 mounted in a housing 39, 139, 239, 339 on the adapter frame 36, 136, 236, 336 for rotating the tailing mechanism 34, 134, 234, 334. In an embodiment, and as shown in the drawings, the adapter frame 36, 136, 236, 336 is directly coupled to the cable puller housing 30 by a suitable rigid linkage 40. In another embodiment, the cable puller adapter 20, 120, 220, 320 is not directly attached to the cable puller 22, but the adapter frame 36, 136, 236, 336 and the cable puller housing 30 are stationary relative to each other during use.

A main on/off switch 42 which is in communication with a controller 44, may be used to start the cable pulling system by applying power to the cable puller motor 32 and to the adapter motor 38. The main on/off switch 42 may be provided by a button or a foot pedal.

Figure 5:
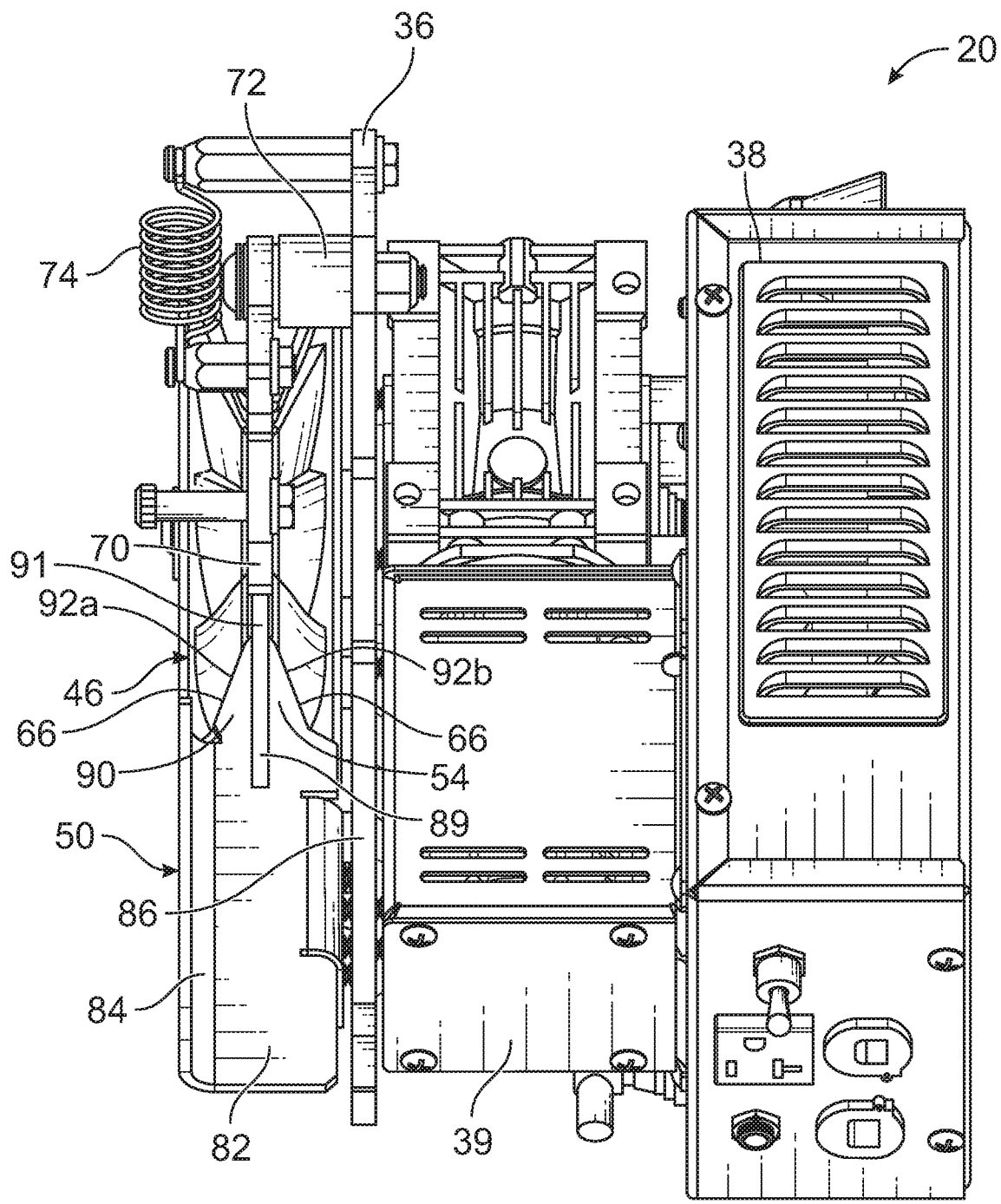
FIG. 5 depicts a rear elevation view of the cable puller adapter shown in FIG. 1.
Figure 6:
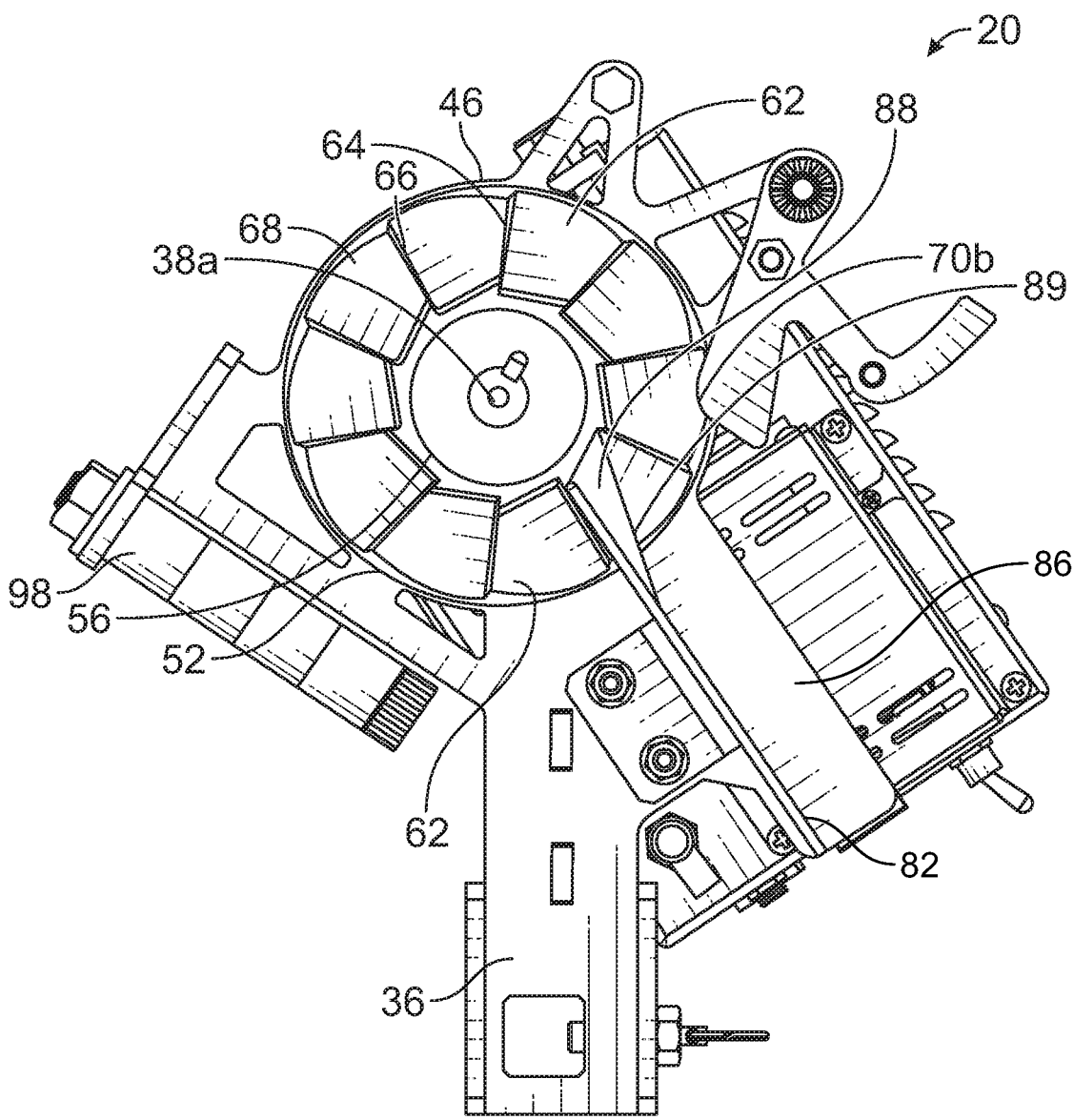
FIG. 6 depicts a cross-sectional view of the cable puller adapter shown in FIG. 1.
Figure 7:
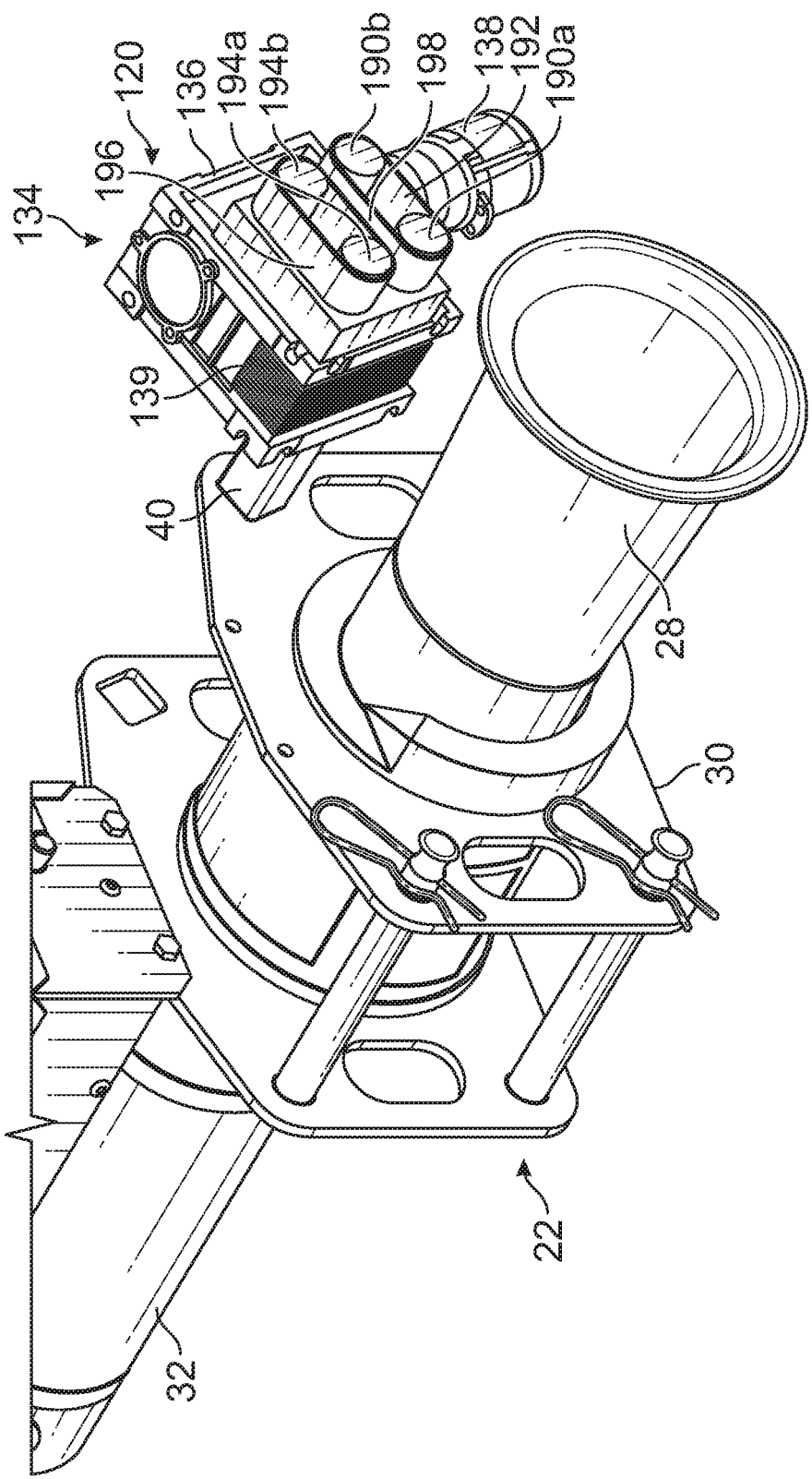
FIG. 7 depicts a perspective view of a second embodiment of a cable puller adapter which can be used with the cable puller shown in FIG. 1.
Figure 8:
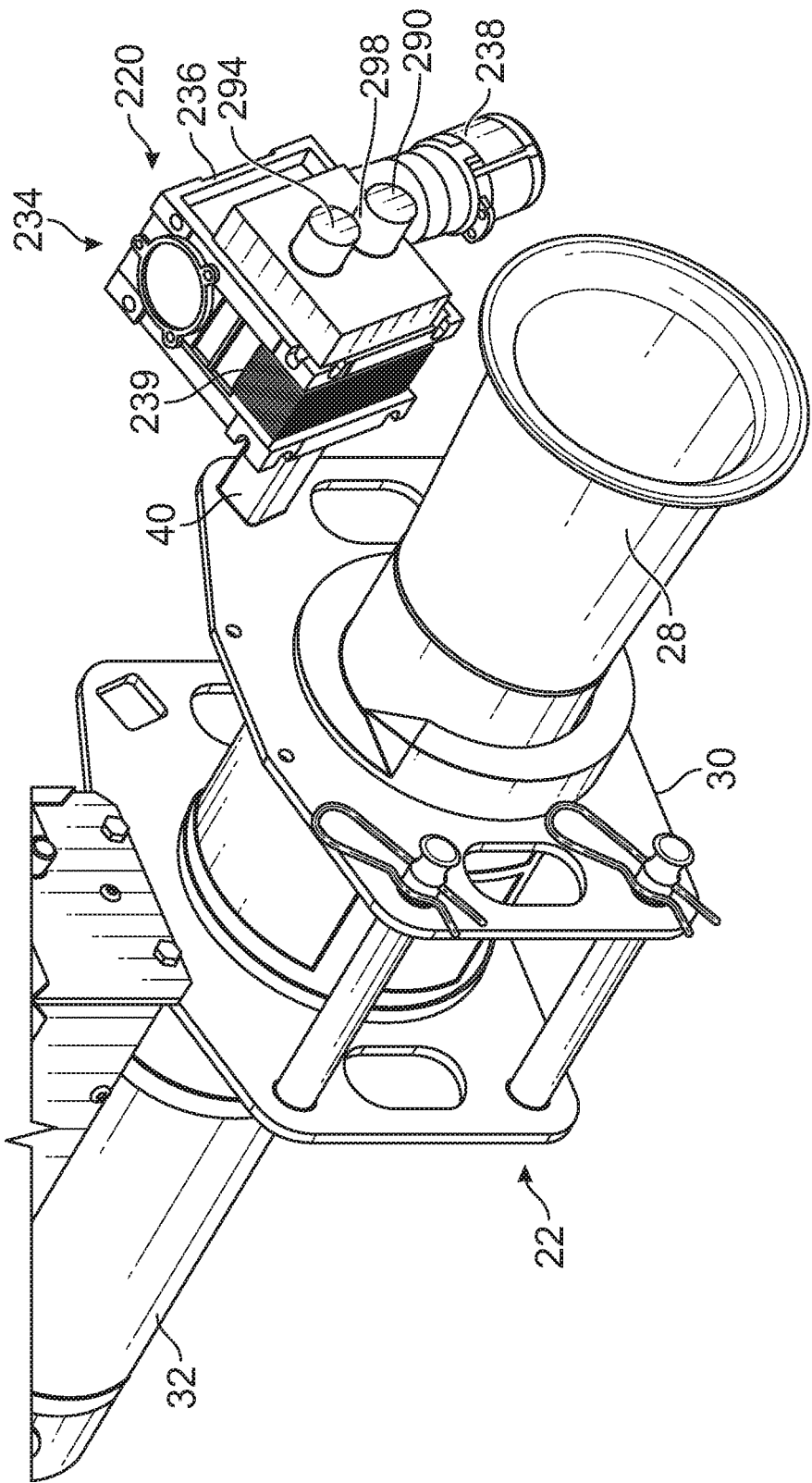
FIG. 8 depicts a perspective view of a third embodiment of a cable puller adapter which can be used with the cable puller shown in FIG. 1.
Figure 9:
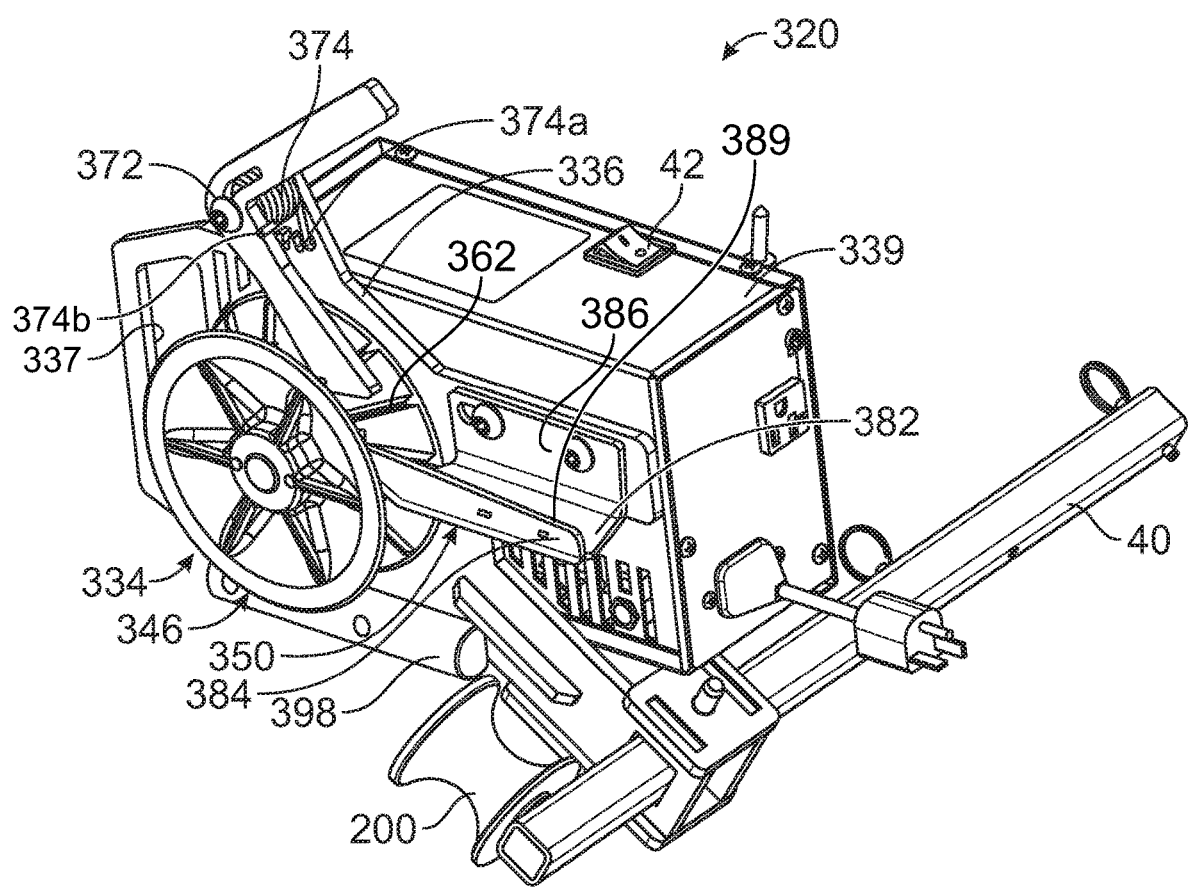
FIG. 9 depicts a perspective view of a fourth embodiment of a cable puller adapter which can be used with the cable puller shown in FIG. 1.
Figure 10:
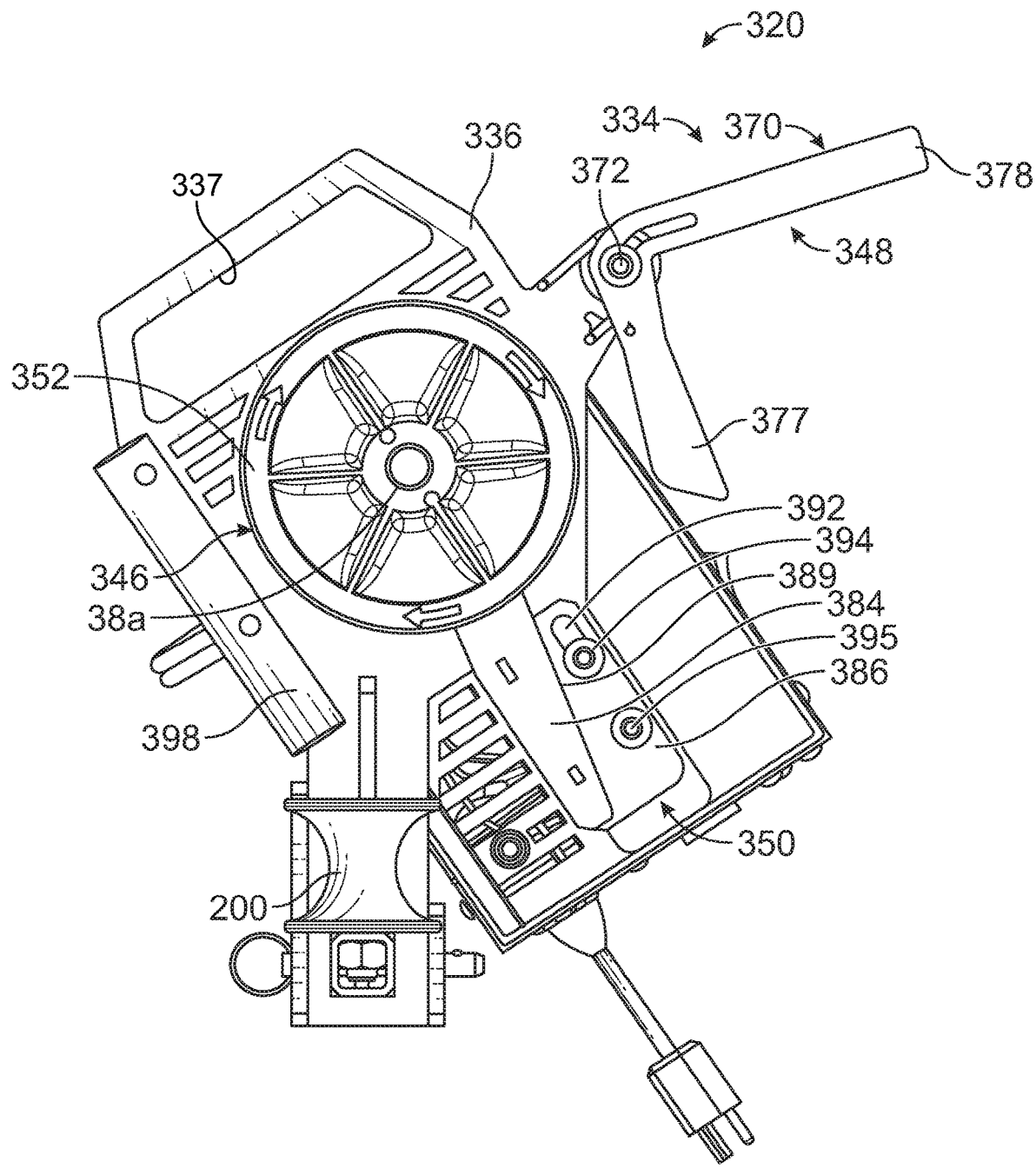
FIG. 10 depicts a side elevation view of the cable puller adapter shown in FIG. 9, and with an extraction guide shown in an in-use position.

A first embodiment of the tailing mechanism 34 is shown in FIGS. 1-6. A second embodiment of the tailing mechanism 134 is shown in FIG. 7. A third embodiment of the tailing mechanism 234 is shown in FIG. 8. A fourth embodiment of the tailing mechanism 334 is shown in FIGS. 9-13.

Attention is invited to the first embodiment of the tailing mechanism 34 shown in FIGS. 1-6. The tailing mechanism 34 includes a pulley 46 fixedly coupled to a motor shaft 38a of the adapter motor 38, a spring-loaded lever 48, and an extraction guide 50.

Figure 4:
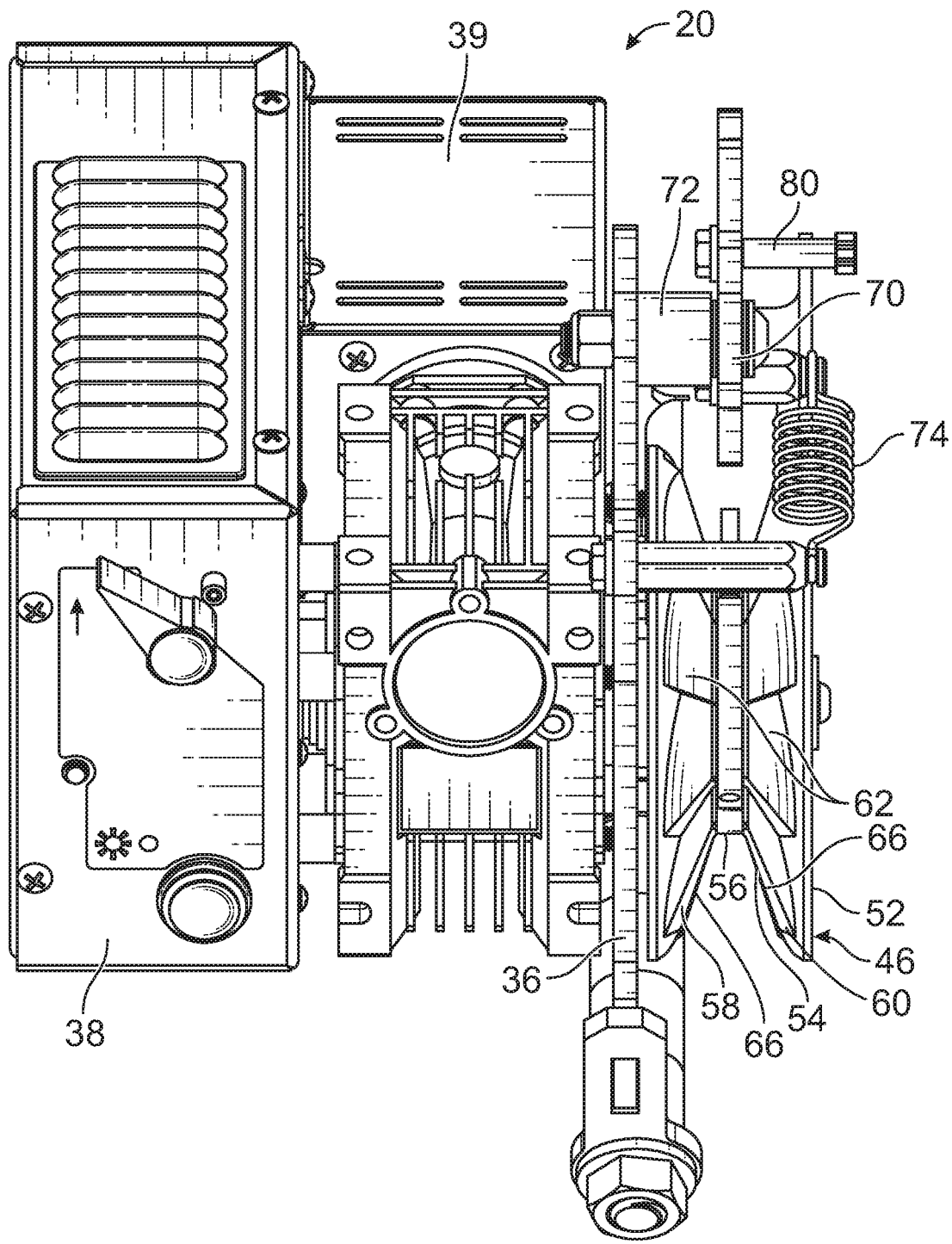
FIG. 4 depicts a top plan view of the cable puller adapter shown in FIG. 1.

The pulley 46 is formed of a circular body 52 having a groove 54 formed circumferentially therearound. The groove 54 is formed by an inner wall 56 which extends circumferentially around the body 52 and which may be cylindrical, and first and second side walls 58, 60 which extend from the inner wall 56 and extend circumferentially around the body 52. The side walls 58, 60 have a gripping structure for gripping the pulling line 26 which couples the pulling line 26 to the tailing mechanism 34 without slippage. In an embodiment, the side walls 58, 60 angle outwardly relative to each other as shown in FIG. 4, and each side wall 58, 60 has a plurality of stepped surfaces 62 which form "teeth" which form the gripping structure for gripping the pulling line 26. When viewed in a side elevation and as shown in the cross-section of FIG. 6, each stepped surface 62 is generally formed as a trapezoidal wedge having it narrowest extent proximate to the inner wall 56 and its widest extent at the outer periphery of the side wall 58, 60. Each wedge has first and second ends 64, 66, with a curved surface 68 therebetween. The first end 64 of each wedge of each side wall 58, 60 is outwardly of the second end 66 of each side wall 58, 60 relative to a plane formed through the rotational axis of the pulley 46. The second end 66 forms a gripping edge for engaging the pulling line 26. The gripping edges formed by the second ends 66 on the first side wall 58 face and align with the gripping edges formed by the second ends 66 on the second side wall 60. When viewed in a top plan view, the gripping edges formed by the second ends 66 generally form a V-shape or U-shape as shown best in FIG. 4. The stepped surfaces 62 accommodate different diameters of pulling line 26. Pulling line 26 with a smaller diameter will seat within the groove 54 closer to the inner wall 56. Pulling line 26 with a larger diameter will seat within the groove 54 closer to the outer periphery of the side walls 58, 60. The gripping edges formed by the second ends 66 engage the pulling line 26 and cause the pulling line 26 to rotate with the pulley 46. Other gripping structures provided on the pulley 46 are within the scope of the disclosure (such as that shown in the fourth embodiment herein).

The spring-loaded lever 48 is positioned proximate to the pulley 46 and further assists in retaining the pulling line 26 in the pulley 46. In an embodiment and as shown, the spring-loaded lever 48 is positioned on the opposite side of the pulley 46 from where the pulling line 26 enters onto the pulley 46 after the pulling line 26 exits off of the capstan 28, however, the spring-loaded lever 48 may be positioned proximate to the pulley 46 at other positions around the pulley 46. The spring-loaded lever 48 includes a lever arm 70 which is pivotably mounted on a shaft 72 which extends outwardly from the adapter frame 36, and an extension spring 74 which has a first end 74a attached to the adapter frame 36 and a second end 74b attached to the lever arm 70. In an embodiment, the first end 74a of the spring 74 is attached to a rod 76 which extends outwardly from the adapter frame 36 and which is parallel to the shaft 72. The lever arm 70 has a first end 70a which is freely rotatably coupled to the shaft 72, and a second free end 70b. In an embodiment, the lever arm 70 further has a L-shaped handle section 78 extending generally from a midpoint of the lever arm 70 and a handle 80 which extends outwardly from the junction of the portions of the L-shaped handle section 78. The second free end 70b of the lever arm 70 is normally biased into the groove 54 of the pulley 46 by the spring 74.

The lever arm 70 can be rotated counterclockwise (in the orientation shown in FIG. 3) against the action of the spring 74 by an operator grasping the handle section 78 and rotating the lever arm 70 counterclockwise around the shaft 72. In an embodiment, the axis of rotation of the lever arm 70 around the shaft 72 is parallel to the axis of rotation of the pulley 46. This counterclockwise rotation of the lever arm 70 removes the second free end 70b of the lever arm 70 from the groove 54 so that the pulling line 26 can be easily inserted into the groove 54. After the pulling line 26 is inserted into the groove 54, the operator releases the handle 80 and the lever arm 70 rotates clockwise (in the orientation shown in FIG. 3) under action of the spring 74 around the shaft 72, and engages its second end 70b against the pulling line 26.

The extraction guide 50 is downstream of the lever arm 70 such that the pulling line 26 engages with the lever arm 70 prior to engagement with the extraction guide 50. The extraction guide 50 is attached to the adapter frame 36 and is spaced from the outer periphery of the pulley 46 such that the extraction guide 50 does not impede rotation of the pulley 46. As best shown in FIGS. 5 and 6, the extraction guide 50 is formed of a base wall 82 which extends radially outwardly from the rotational axis of the pulley 46, first and second side walls 84, 86 extending from side edges of the base wall 82, and a ramp wall 88 having an upper surface which forms a ramped surface 89 and extending from the base wall 82 between the side walls 84, 86. In an embodiment, the first and second side walls 84, 86 are planar and extend in a direction which is perpendicular to the base wall 82. The ramp wall 88 is perpendicular to the base wall 82, and in an embodiment, the ramp wall 88 is parallel to the side walls 84, 86. The base wall 82 has a width which is the same as, or slightly greater than a width of the pulley 46 which is defined by the outer surfaces of the side walls 58, 60, except for a front end 90 thereof which seats between the side walls 58, 60. A front end 91 of the ramp wall 88 seats between the side walls 58, 60 forwardly of the front end 90 and has an end surface which mirrors the shape of the inner wall 56. The front ends 90, 91 substantially fill the groove 54. As shown, the front end 90 has edges 92a, 92b which angle toward each other and generally form a V-shape or U-shape as shown best in FIG. 5.

In use, the pulling line 26, which is attached to the electrical cable or wire to be routed through the conduit/cable tray, exits the conduit/cable tray and is wrapped one or more times around the capstan 28 to form a frictional, yet slippable interface. The tailing end of the pulling line 26 is looped over the pulley 46 and is positioned underneath the spring-loaded lever 48, and then placed into the extraction guide 50. The pulling line 26 lays on the ramped surface 89 of the ramp wall 88 and between the side walls 58, 60. Because the front end 90 of the base wall 82 fills the groove 54, the pulling line 26 cannot pass between the extraction guide 50 and the pulley 46. Because the pulling line 26 is fixed to one end of the electrical cable or wire by a splice, the velocity thereof, as referred to herein, is referred to as "cable velocity" rather than pulling line velocity, although both quantities are equal. The gripping structure for gripping the pulling line 26, such as stepped surfaces 62, in the pulley 46 engage the pulling line 26 and the free end 70b of the spring-loaded lever 48 engages the pulling line 26 and biases the pulling line 26 into the groove 54 and into further engagement with the gripping structure for gripping the pulling line 26. The cable puller motor 32 drives the capstan 28, and the adapter motor 38 drives the pulley 46. This causes the pulling line 26 to be routed around the capstan 28, around a portion of the pulley 46, underneath the spring-loaded lever 48 and into the extraction guide 50. When the pulling line 26 contacts the ramped surface 89 of the ramp wall 88 of the extraction guide 50, the pulling line 26 is disengaged from the pulley 46 and is routed for accumulation on the floor. After the pulling line 26 has been pulled through the conduit/cable tray so that the splice between the electrical cable or wire and the pulling line 26 emerges, the pull is essentially complete. The cable puller 22 and cable puller adapter 20 may be set back several feet away from the end of the conduit/cable tray so that once the end of pulling line 26 where the splice is located approaches the capstan 28, the cable pulling system may be turned off. At this point, several feet of the electrical cable or wire which has been pulled through the conduit/cable tray has emerged from the end of the conduit/cable tray. The pulling line 26 is then disconnected from the electrical cable or wire, and the electrical cable or wire may then be connected to the appropriate installation components specific to the job, such a terminal connector, terminal block, and the like, or may be spliced to other various cables or wires.

A freely-rotatable roller or a plurality of freely-rotatable rollers 98 may be attached to the adapter frame 36 proximate to the position where the pulling line 26 first overlaps the adapter frame 36. The axis of rotation of the roller or a plurality of rollers 98 is generally transverse to the direction that the pulling line 26 travels as it is being wrapped around the capstan 28. The pulling line 26 may contact the roller or a plurality of rollers 98 prior to engagement with the capstan 28. The roller or a plurality of rollers 98 prevent the pulling line 26 from engaging against an edge of the adapter frame 36, thereby preventing wear on the pulling line 26.

Attention is invited to the second embodiment of the tailing mechanism 134 shown in FIG. 7. The tailing mechanism 134 includes a first set of spaced apart rollers 190a, 190b having an endless belt 192 wrapped therearound, and a second set of spaced apart rollers 194a, 194b having an endless belt 196 wrapped therearound. Roller 190a aligns with roller 194a, and roller 190b aligns with roller 194b such that the facing surfaces of the belts 192, 196 are parallel to each other. A gap 198 is formed between the first set of rollers/belt 190a, 190b/192 and the second set of rollers/belt 194a, 194b/196. The first set of rollers/belt 190a, 190b/192 is translatably fixed in position relative to the adapter frame 136, and roller 190a is fixedly coupled to the motor shaft 38a of the adapter motor 38 such that the roller 190a rotates under action of the adapter motor 38, which causes rotation of the belt 192 and the roller 190b. That is, the first set of rollers/belt 190a, 190b/192 is only rotational relative to the adapter frame 136. The second set of rollers/belt 194a, 194b/196 is translatable relative to the adapter frame 136 and relative to the first set of rollers/belt 190a, 190b/192 to widen or narrow the gap 198. Suitable structures (not shown) are provided to impart this movement and then to fix the second set of rollers/belt 194a, 194b/196 in place relative to the first set of rollers/belt 190a, 190b/192.

In use, the second set of rollers/belt 194a, 194b/196 is moved away from the first set of rollers/belt 190a, 190b/192 to widen the gap 198. The pulling line 26, which is attached to the electrical cable or wire to be routed through the conduit/cable tray, exits the conduit/cable tray and is wrapped one or more times around the capstan 28 to form a frictional, yet slippable interface. The tailing end of the pulling line 26 is positioned on top of the belt 192 and the second set of rollers/belt 194a, 194b/196 is moved toward the first set of rollers/belt 190a, 190b/192 to narrow the gap 198 and to engage and grip the pulling line 26 and form a gripping structure which couples the pulling line 26 to the tailing mechanism 134 without slippage. Because the pulling line 26 is fixed to one end of the electrical cable or wire by a splice, the velocity thereof, as referred to herein, is referred to as "cable velocity" rather than pulling line velocity, although both quantities are equal. The cable puller motor 32 drives the capstan 28, and the adapter motor 38 drives the roller 190a. This causes the pulling line 26 to be routed around the capstan 28 and between the belts 192, 196. When the pulling line 26 exits the belts 192, 196, the pulling line 26 falls onto the floor for accumulation. After the pulling line 26 has been pulled through the conduit/cable tray so that the splice between the electrical cable or wire and the pulling line 26 emerges, the pull is essentially complete. The cable puller 22 and cable puller adapter 120 may be set back several feet away from the end of the conduit/cable tray so that once the end of pulling line 26 where the splice is located approaches the capstan 28, the cable pulling system may be turned off. At this point, several feet of the electrical cable or wire which has been pulled through the conduit/cable tray has emerged from the end of the conduit/cable tray. The pulling line 26 is then disconnected from the electrical cable or wire, and the electrical cable or wire may then be connected to the appropriate installation components specific to the job, such a terminal connector, terminal block, and the like, or may be spliced to other various cables or wires.

Attention is invited to the third embodiment of the tailing mechanism 234 shown in FIG. 8. The tailing mechanism 234 includes a set of spaced apart rollers 290, 294 which are aligned with each other and such that a gap 298 is formed therebetween. The roller 290 is translatably fixed in position relative to the adapter frame 236, and roller 290 is fixedly coupled to the motor shaft 38a of the adapter motor 38 such that the roller 290 rotates under action of the adapter motor 38. That is, the roller 290 is only rotational relative to the adapter frame 236. The roller 294 is translatable relative to the adapter frame 236 and relative to the roller 290 to widen or narrow the gap 298. Suitable structures (not shown) are provided to impart this movement and then to fix the roller 294 in place relative to the roller 290.

In use, the roller 294 is moved away from the roller 290 to widen the gap 298. The pulling line 26, which is attached to the electrical cable or wire to be routed through the conduit/cable tray, exits the conduit/cable tray and is wrapped one or more times around the capstan 28 to form a frictional, yet slippable interface. The tailing end of the pulling line 26 is positioned on top of the roller 290 and the roller 294 is moved toward the roller 290 to narrow the gap 298 and to engage and grip the pulling line 26 and form a gripping structure which couples the pulling line 26 to the tailing mechanism 234 without slippage. Because the pulling line 26 is fixed to one end of the electrical cable or wire by a splice, the velocity thereof, as referred to herein, is referred to as "cable velocity" rather than pulling line velocity, although both quantities are equal. The cable puller motor 32 drives the capstan 28, and the adapter motor 38 drives the roller 290. This causes the pulling line 26 to be routed around the capstan 28 and between the rollers 290, 294. When the pulling line 26 exits the rollers 290, 294, the pulling line 26 falls onto the floor for accumulation. After the pulling line 26 has been pulled through the conduit/cable tray so that the splice between the electrical cable or wire and the pulling line 26 emerges, the pull is essentially complete. The cable puller 22 and cable puller adapter 220 may be set back several feet away from the end of the conduit/cable tray so that once the end of pulling line 26 where the splice is located approaches the capstan 28, the cable pulling system may be turned off. At this point, several feet of the electrical cable or wire which has been pulled through the conduit/cable tray has emerged from the end of the conduit/cable tray. The pulling line 26 is then disconnected from the electrical cable or wire, and the electrical cable or wire may then be connected to the appropriate installation components specific to the job, such a terminal connector, terminal block, and the like, or may be spliced to other various cables or wires.

Attention is invited to the fourth embodiment of the tailing mechanism 334 shown in FIGS. 9-13. The tailing mechanism 334 includes a pulley 346 fixedly coupled to the motor shaft 38a of the adapter motor 38, a spring-loaded lever 348, and an extraction guide 350.

The adapter frame 336 has an opening 337 formed therethrough to allow an operator to carry the tailing mechanism 334. Such an opening 337 can also be provided in the adapter frames 36, 136, 236. In an embodiment and as shown, the opening 337 is on one side of the pulley 346 and the tailing mechanism 334 is on the other side of the pulley 346. The opening 337 can be provided through other parts of the adapter frame 336 to allow an operator to carry the tailing mechanism 334.

Figure 11:
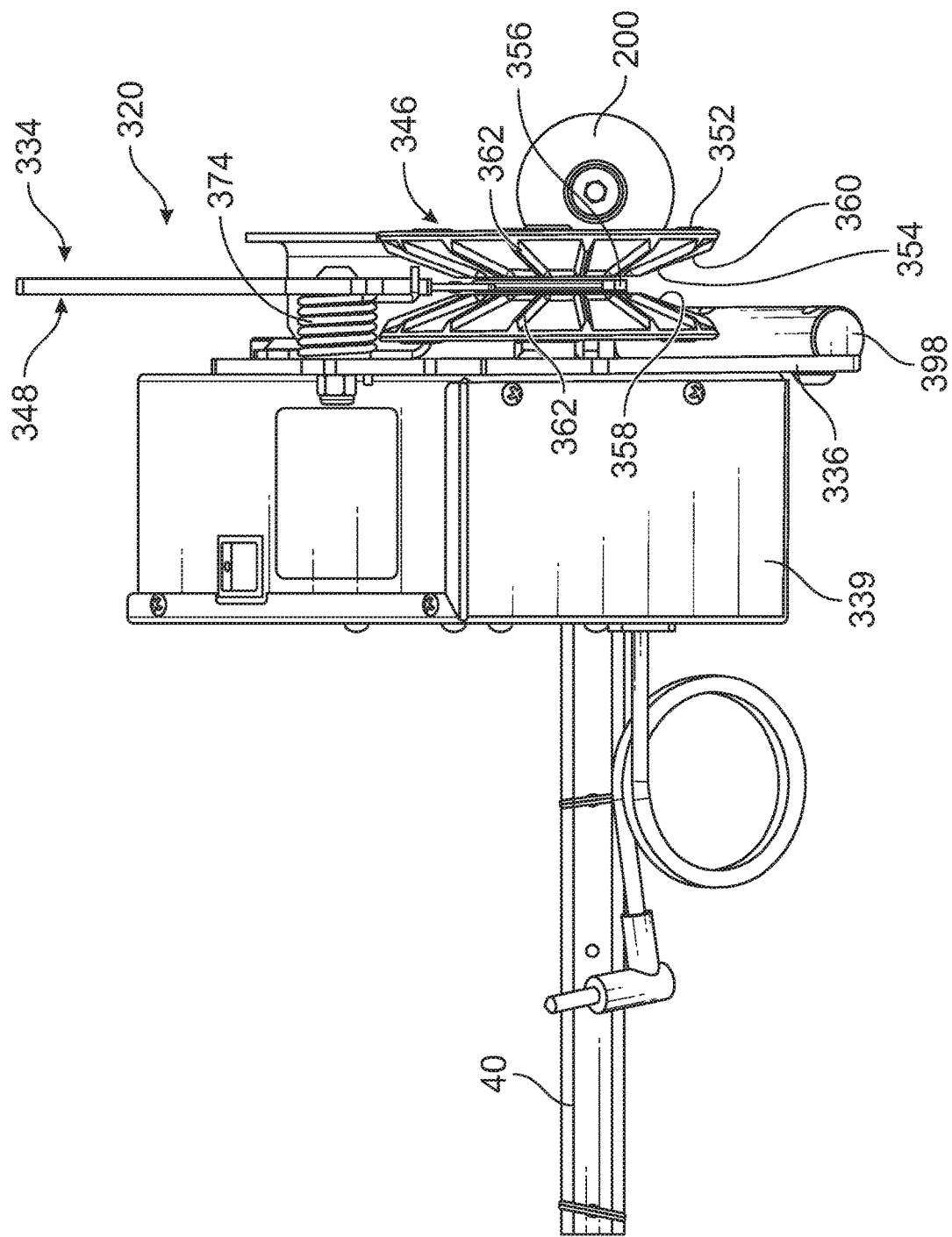
FIG. 11 depicts a top plan view of the cable puller adapter shown in FIG. 9.
Figure 12:
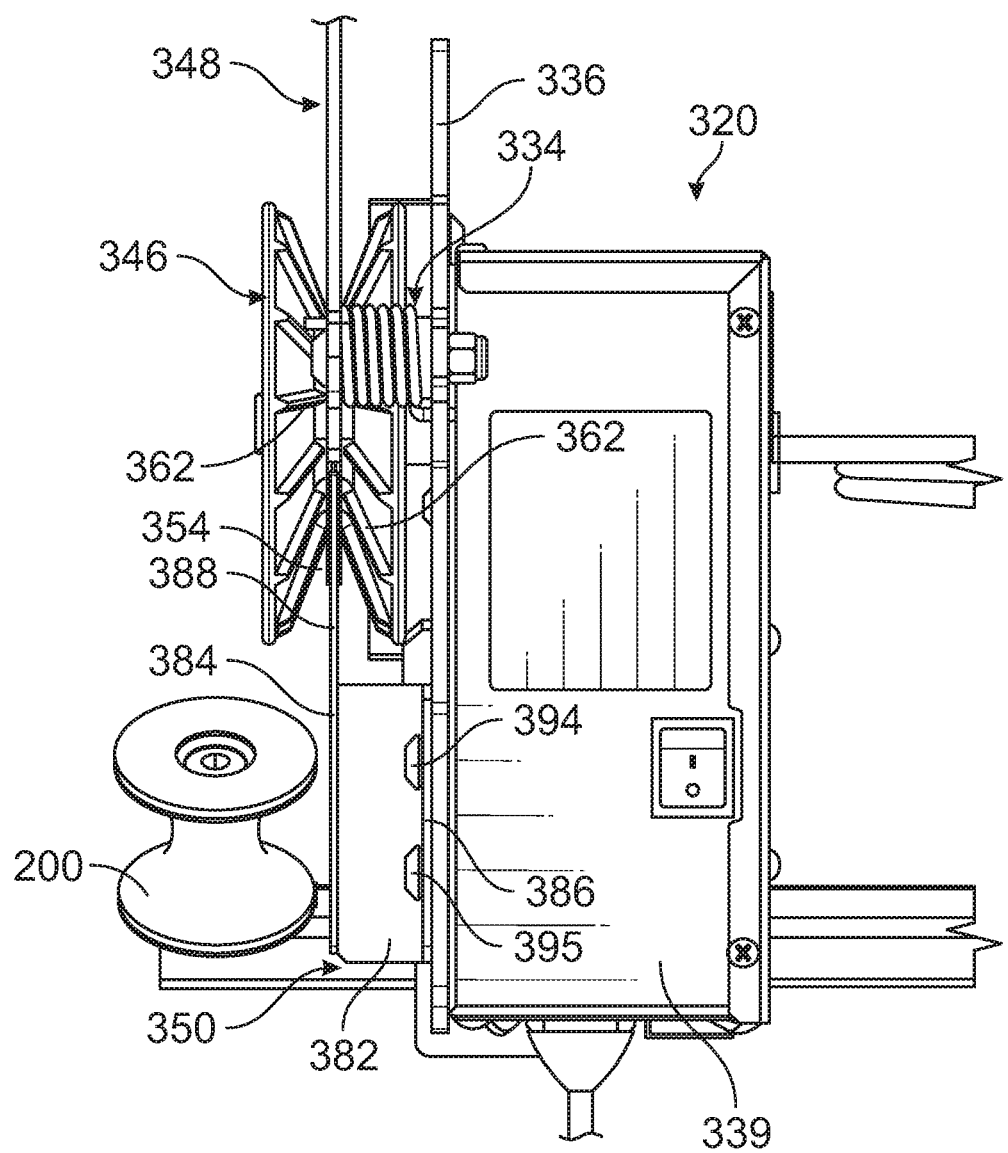
FIG. 12 depicts a rear elevation view of the cable puller adapter shown in FIG. 9.
Figure 13:
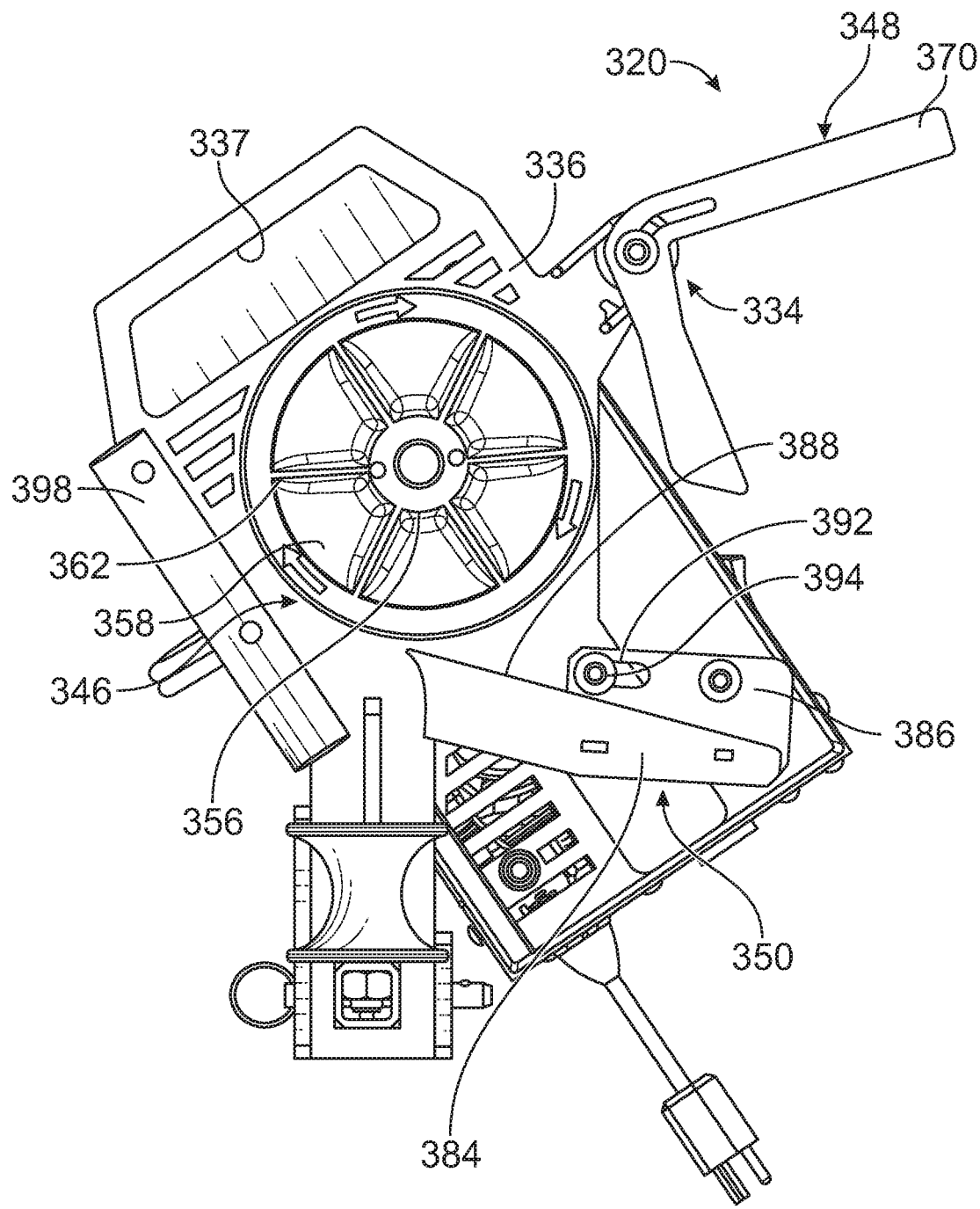
FIG. 13 depicts a side elevation view of the cable puller adapter shown in FIG. 9, and with the extraction guide shown in pivoted position.

The pulley 346 is formed of a circular body 352 having a groove 354 formed circumferentially therearound. The groove 354 is formed by an inner wall 356 which extends circumferentially around the body 352 and which may be cylindrical, and first and second side walls 358, 360 which extend from the inner wall 356 and extend circumferentially around the body 352. The side walls 358, 360 have a gripping structure for gripping the pulling line 26 which couples the pulling line 26 to the tailing mechanism 334 without slippage. In an embodiment, the side walls 358, 360 angle outwardly relative to each other as shown in FIG. 11, and each side wall 358, 360 has a plurality of spaced apart projections 362 which form "teeth" which form the gripping structure for gripping the pulling line 26. When viewed in a side elevation, each projection 362 is generally formed as an elongated bar that extends outwardly from the side walls 358, 360 and into the groove 354. Each projection 362 generally starts at the inner wall 356 and extends outwardly along the respective side wall 358, 360. Each projection 362 extends at an angle relative to a radial line extending from a center of the respective side wall 358, 360. In cross-section, each projection 362 is generally formed as a trapezoid. The inner end of each projection 362 forms a gripping edge for engaging the pulling line 26. The gripping edges formed by the inner ends of the projections 362 on the first side wall 358 face and align with the gripping edges formed by the inner ends of the projections 362 on the second side wall 360. When viewed in a top plan view, the gripping edges generally form a V-shape or U-shape as shown best in FIG. 11. The projections 362 accommodate different diameters of pulling line 26. Pulling line 26 with a smaller diameter will seat within the groove 354 closer to the inner wall 356. Pulling line 26 with a larger diameter will seat within the groove 354 closer to the outer periphery of the side walls 358, 360. The gripping edges engage the pulling line 26 and cause the pulling line 26 to rotate with the pulley 346. Other gripping structures provided on the pulley 46 are within the scope of the disclosure (such as that shown in the first embodiment herein).

The spring-loaded lever 348 is positioned proximate to the pulley 346 and further assists in retaining the pulling line 26 in the pulley 346. In an embodiment and as shown, the spring-loaded lever 348 is positioned on the opposite side of the pulley 346 from where the pulling line 26 enters onto the pulley 346 after the pulling line 26 exits off of the capstan 28, however, the spring-loaded lever 348 may be positioned proximate to the pulley 346 at other positions around the pulley 346. The spring-loaded lever 348 includes a lever arm 370 which is pivotably mounted on a shaft 372 which extends outwardly from the adapter frame 336, and a torsion spring 374 wrapped around the shaft 372 and positioned between the adapter frame 336 and the lever 348. A first end 374a of the spring 374 is attached to the adapter frame 336 and a second end 374b of the spring 374 is attached to the lever arm 370. The lever arm 370 is generally L-shaped having a first portion 377 which extends into the groove 354 and ends in a free end 370b, and a second portion 378 which forms a handle. The lever arm 370 is mounted on the shaft 372 at the elbow between the first and second portions 377, 378. The free end 370b of the lever arm 370 is normally biased into the groove 354 of the pulley 346 by the spring 374.

The lever arm 370 can be rotated counterclockwise (in the orientation shown in FIG. 10) against the action of the spring 374 by an operator grasping the second portion 378 and rotating the lever arm 370 counterclockwise around the shaft 372. In an embodiment, the axis of rotation of the lever arm 370 around the shaft 372 is parallel to the axis of rotation of the pulley 346. This counterclockwise rotation of the lever arm 370 removes the free end 370b of the lever arm 370 from the groove 354 so that the pulling line 26 can be easily inserted into the groove 354. After the pulling line 26 is inserted into the groove 354, the operator releases the lever arm 370 which rotates clockwise (in the orientation shown in FIG. 10) under action of the spring 374 around the shaft 372, and engages its second end 370b against the pulling line 26.

The extraction guide 350 is downstream of the lever arm 370 such that the pulling line 26 engages with the lever arm 370 prior to engagement with the extraction guide 350. The extraction guide 350 is attached to the adapter frame 336 and is spaced from the outer periphery of the pulley 346 such that the extraction guide 350 does not impede rotation of the pulley 346. As best shown in FIGS. 9, 10, 12 and 13, the extraction guide 350 is formed of a base wall 382 which extends radially outwardly from the rotational axis of the pulley 346 when the extraction guide 350 is routing the pulling line 26 away from the pulley 346, and first and second side walls 384, 386 extending from side edges of the base wall 382. In an embodiment, the first and second side walls 384, 386 are planar and extend in a direction which is perpendicular to the base wall 382. The side wall 384 extends forwardly of the base wall 382 and the side wall 386, and the upper surface of the side wall 384 forms a ramped surface 388. The side wall 384 has a width which is the same as, or slightly less than a width of the inner wall 356 which is defined between the side walls 358, 360 such that the front end of the side wall 384 substantially fills the groove 354.

The side wall 386 of the extraction guide 350 is proximate to, and may abut against, the adapter frame 336. The side wall 386 includes at least one elongated slot 392 therethrough which is parallel to the base wall 382. A headed fastener 394 extends from the adapter frame 336 and extends through the side wall 386 and through the slot 392. The extraction guide 350 can slide along the fastener 394 along the length of the slot 392 to pivot the extraction guide 350 such that the ramped surface 388 is in the groove 354 in an in-use position, see FIGS. 9, 10 and 12, or downwardly out of the groove 354, see FIG. 13, in a non-use position. In the in-use position, the ramped surface 388 is in proximate engagement with the pulley 346 while the base wall 382 is separated from the pulley 346. A second fastener 395 affixes the extraction guide 350 when pivoted into the groove 354 in the in-use position. In an embodiment, the fastener 395 is removed from the side wall 386 and the adapter frame 336 during the movement of the extraction guide 350. In an embodiment, the fastener 395 remains attached to the side wall 386 during the movement of the extraction guide 350.

While the extraction guide 350 is shown as being pivoted relative to the pulley 346, the extraction guide 350 can instead be slid away from the pulley 346.

In use, the pulling line 26, which is attached to the electrical cable or wire to be routed through the conduit/cable tray, exits the conduit/cable tray and is wrapped one or more times around the capstan 28 to form a frictional, yet slippable interface. The tailing end of the pulling line 26 is looped over the pulley 346 and is positioned underneath the spring-loaded lever 348, and then placed into the extraction guide 350. The pulling line 26 lays on the ramped surface 388 of the side wall 384 and then is positioned on the base wall 382 between the side walls 358, 360. Because the front end of the side wall 384 fills the groove 354, the pulling line 26 cannot pass between the extraction guide 350 and the pulley 346. Because the pulling line 26 is fixed to one end of the electrical cable or wire by a splice, the velocity thereof, as referred to herein, is referred to as "cable velocity" rather than pulling line velocity, although both quantities are equal. The gripping structure for gripping the pulling line 26, such as the projections 362, in the pulley 346 engage the pulling line 26 and the end 370b of the spring-loaded lever 348 engages the pulling line 26 and biases the pulling line 26 into the groove 354 and into further engagement with the gripping structure for gripping the pulling line 26. The cable puller motor 32 drives the capstan 28, and the adapter motor 38 drives the pulley 346. This causes the pulling line 26 to be routed around the capstan 28, around a portion of the pulley 346, underneath the spring-loaded lever 348 and into the extraction guide 350. When the pulling line 26 contacts the ramped surface 388 of the side wall 384 of the extraction guide 350, the pulling line 26 is disengaged from the pulley 346 and is routed for accumulation on the floor. After the pulling line 26 has been pulled through the conduit/cable tray so that the splice between the electrical cable or wire and the pulling line 26 emerges, the pull is essentially complete. The cable puller 22 and cable puller adapter 320 may be set back several feet away from the end of the conduit/cable tray so that once the end of pulling line 26 where the splice is located approaches the capstan 28, the cable pulling system may be turned off. At this point, several feet of the electrical cable or wire which has been pulled through the conduit/cable tray has emerged from the end of the conduit/cable tray. The pulling line 26 is then disconnected from the electrical cable or wire, and the electrical cable or wire may then be connected to the appropriate installation components specific to the job, such a terminal connector, terminal block, and the like, or may be spliced to other various cables or wires.

A radiused bar 398 may be attached to the adapter frame 336 proximate to the position where the pulling line 26 first overlaps the adapter frame 336. The bar 398 is generally transverse to the direction that the pulling line 26 travels as it is being wrapped around the capstan 28. The pulling line 26 may contact the bar 398 prior to engagement with the capstan 28. The bar 398 prevent the pulling line 26 from engaging against an edge of the adapter frame 336, thereby preventing wear on the pulling line 26.

In an embodiment, a freely rotatable idler roller 200 is mounted to the linkage 40 and is spaced from the tailing mechanism 34, 134, 234, 334. If desired, the operator can route the tailing end of the pulling line 26 around the idler roller 200 instead of using the tailing mechanism 34, 134, 234, 334. This allows for hand tailing of the pulling line 26 by the operator in a conventional manner.

Figure 15:
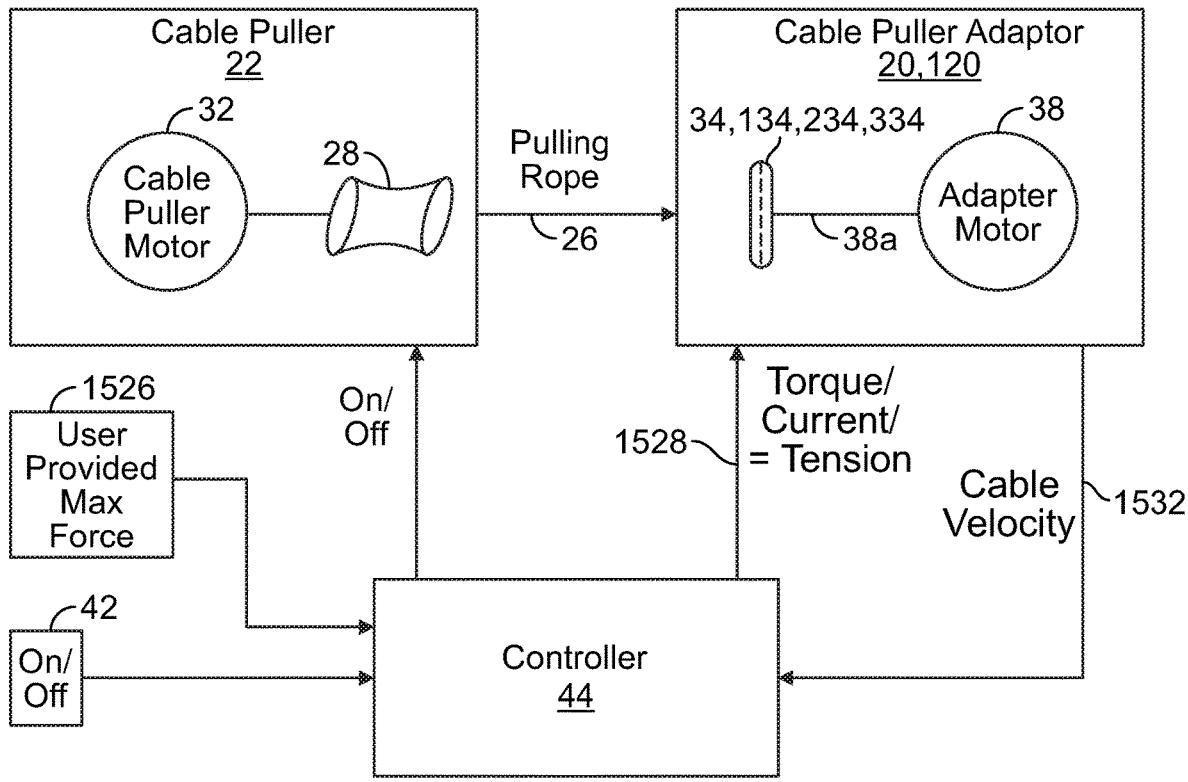
FIG. 15 depicts a high-level block diagram of the cable puller, the cable puller adapter, and controller, according to one embodiment.

Turning now to FIG. 15, the controller 44 is configured to drive the adapter motor 38 at an optimal level of torque so as to maximize the rotational velocity of the pulley 46 or the roller 190a, 290 which directly translates into a maximum or optimal velocity of the cable (pulling speed) being pulled via the cable puller motor 32 as the pulling line 26 traverses the capstan 28.

In one embodiment, a maximum force set point may be manually set using a dial 1526 or other switch to limit the maximum torque applied to the capstan 28 by the cable puller motor 32. This may be a safety feature so as not to exceed motor stall parameters and/or cable or rope strength parameters. Thus, even if too much tension is applied by the adapter motor 38 (e.g., the tailing force) so as to reduce the slippage between the pulling line 26 and the capstan 28 to zero, the cable puller motor 32 will stall rather than applying a force to the capstan 28, which could otherwise damage or break the cable being pulled. The maximum force set point may be set based on the type or thickness of the cable and/or pulling line 26 being pulled, and thus could change from job to job.

As discussed above, the pulling line 26 being pulled through the conduit/cable tray exits the conduit/cable tray and is wrapped one or more times around the capstan 28 to form a frictional, yet slippable interface. The result of this is that cable puller motor 32 exerts a maximum force or tension on the pulling line 26 (and the electrical cable or wire attached to the pulling line 26) via the capstan 28 when the friction between the capstan 28 and the wrapped portion of the pulling line 26 is at a maximum (e.g., little or no slippage), and conversely exerts a minimum force or tension on the pulling line 26 via the capstan 28 when the friction between the capstan 28 and the wrapped portion of the pulling line 26 is at a minimum (e.g., little traction, high degree of slippage). A relationship exists between an optimal level of friction and slippage of the pulling line 26 relative to the capstan 28. In the present disclosure, an optimal level of friction and slippage is controlled by using the tailing mechanism 34, 134, 234, 334 by controlling the tailing force applied to the pulling line 26 at a position immediately after the pulling line 26 has been wrapped about the capstan 28. With known cable pullers, such a tailing force is applied by the human operator using experience and judgment to determine the precise force applied by hand. In that regard, if too little tailing force is applied, friction between the pulling line 26 and the capstan 28 will be insufficient, which results in an inordinate amount of slippage (or total slippage), and thus a lower than optimal cable velocity (or zero velocity at worst case). Conversely, if the tailing force applied is too great, the pulling line 26 binds up against itself and against the base of the capstan 28, and creates excessive friction which may result in overloading the cable puller motor 32 of the capstan 28, or in some cases, damage to the electrical cable or wire or even the pulling line 26. This may cause the cable puller motor 32 of the capstan 28 to stall thus reducing the cable velocity, possibly to a velocity of zero (again, worst case).

Accordingly, there is an optimal level of tailing force to be applied to the pulling line 26, which embodiments of the present disclosure seek to optimize, so as to maximize the velocity of the electrical cable or wire being pulled. Such an optimal level of required tailing force may change dynamically as different lengths or portions of the electrical cable or wire make its way through the conduit/cable tray during the pulling process. To optimize this level of tailing force, the adapter motor 38 may vary the level of torque applied to the pulley 46 or roller 190a, 290 as controlled by the power/voltage applied to the adapter motor 38.

Because the pulling line 26 is coupled to the tailing mechanism 34, 134, 234, 334 without slippage, the tension on the pulling line 26 between the tailing mechanism 34, 134, 234, 334 and the capstan 28 may be accurately controlled by the adapter motor 38, which essentially provides the tailing force via the tailing mechanism 34, 134, 234, 334.

Figure 16:
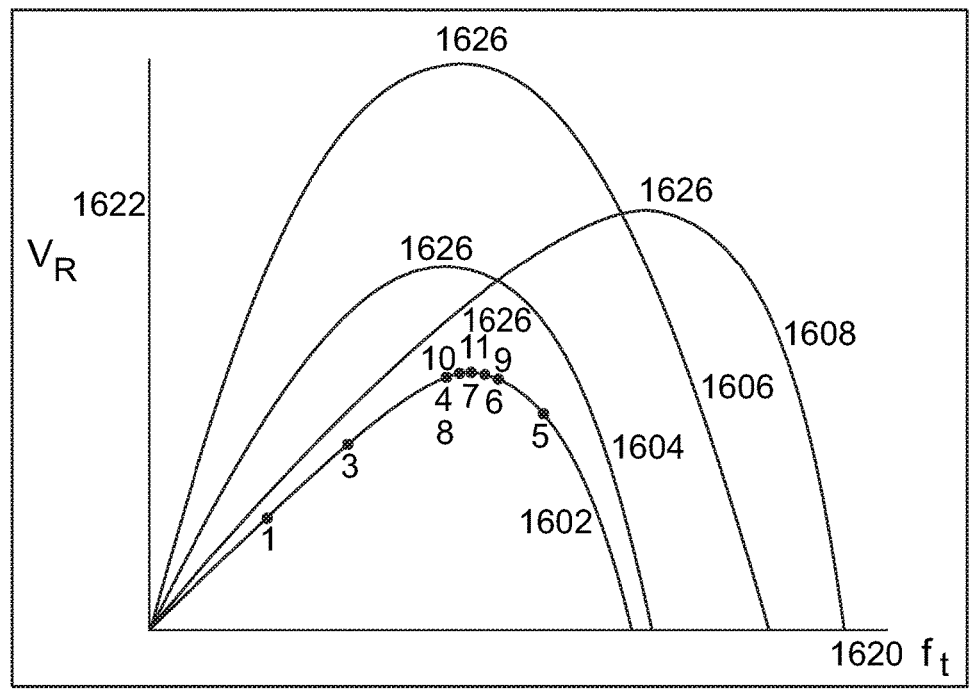
FIG. 16 depicts a graph showing tailing force and cable velocity for four different cable applications or environments, according to one embodiment.

Referring to FIG. 16, a graph shows four curves (1502, 1604, 1606, 1608) with tailing force 1620 on the x-axis and cable velocity on the y-axis 1622. Each curve represents a different application or environment, which may be dependent on various physical parameters, such as cable or wire type, cable or wire diameter, cable or wire flexibility, temperature, humidity, and the like. As shown in each graph (1502, 1604, 1606, 1608), there is an optimal value of the tailing force which results in a maximum cable velocity or pulling speed, shown as the peak 1626 of each curve. Maximizing cable velocity or pulling speed increases the efficiency of the particular job by allowing the entire length of the electrical cable or wire to be pulled through the conduit/cable tray in the least amount of time so as to complete the job.

As shown in the graphs (1502, 1604, 1606, 1608) of FIG. 16, if too little tailing force is applied, the cable velocity is reduced, which may be represented by points to the left of the curve peak 1626. If too much tailing force is applied, the cable velocity may also be reduced, which may be represented by points to the right of the curve peak 1626. However, there is an optimal tailing force that results in a maximum cable velocity, as represented by the curve peak 1626.

The cable pulling environment is a dynamically changing environment, and the optimal tailing force to be applied constantly changes. For this reason, a specific tailing force cannot be calculated in advance and does not remain fixed throughout the cable pulling process. Rather, the tailing force must be continuously adjusted over time (also known as "dithering") to obtain the maximum cable velocity.

Turning back to FIG. 15, as set forth above, to control and maximize the velocity of the electrical cable or wire being pulled, the controller 44 controls a power (voltage) 1528 provided to the adapter motor 38. The power 1528 provided directly translates into amount of current used by the adapter motor 38, which in turn, is representative of the torque applied to the tailing mechanism 34, 134, 234, 334. The torque applied to the tailing mechanism 34, 134, 234, 334 is essentially the tension or tailing force on the pulling line length between the tailing mechanism 34, 134, 234, 334 and the capstan 28.

The velocity of the electrical cable or wire (more specifically, the velocity of the pulling line 26), is the same as the tangential velocity of the pulley 46 or roller 190a, 290 of the tailing mechanism 34, 134, 234, 334, and is directly proportional to the rotational speed of the adapter motor 38, as no slippage is assumed to occur between the pulling line 26 and the tailing mechanism 34, 134, 234, 334. The rotational speed of the adapter motor 38 may be determined by an encoder or by Hall sensors operatively coupled to a shaft 38a of the adapter motor 38, or other sensors coupled to the adapter motor 38. The Hall sensors or other sensors provide an indication 1532 of the cable velocity as an input to the controller 44. Preferably, the adapter motor 38 is a brushless DC motor having integrated Hall devices. In other embodiments, rather than using an encoder or Hall sensors as an indication of cable velocity, a separate velocity measuring device may be used, such as an external roller, external encoder, or wheel that contacts the pulling line 26.

Figure 17:
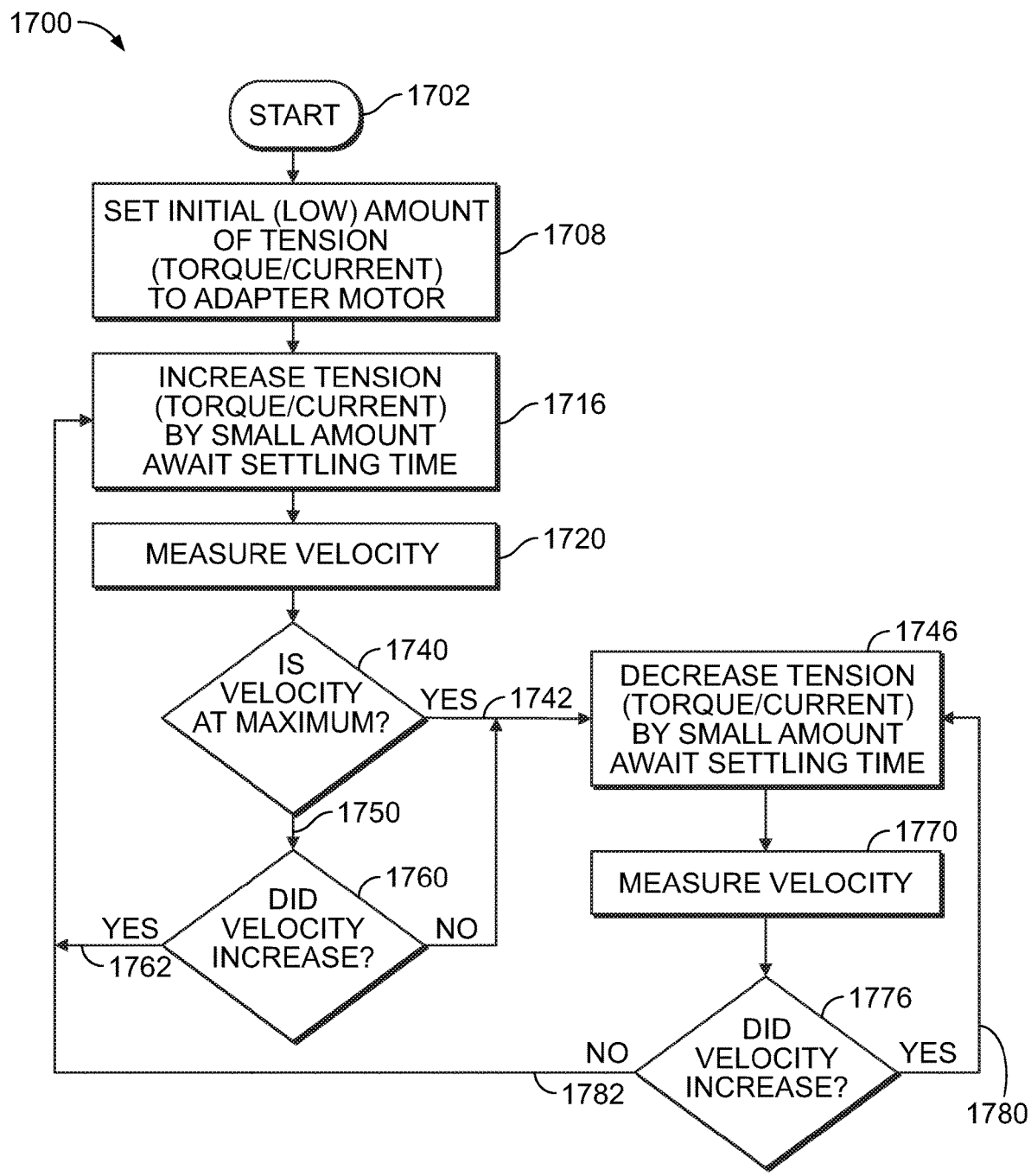
FIG. 17 depicts a flowchart illustrating processing steps taken by a controller, according to one embodiment.

FIG. 17 is a flowchart showing the steps 1700 that may be taken in one embodiment, by the controller 44 to establish and continuously dither or modulate the optimal tailing force so as to maximize the cable velocity. The process starts at step 1702, and a default or initial low power or starting current/torque is applied at step 1708 to the adapter motor 38. Next, the current/torque to the adapter motor 38 is slightly increased at step 1716, and the controller 44 waits for a small amount of settling time, for example, 50 milliseconds, for the adapter motor 38 to react and reach a steady state.

The velocity of the electrical cable or wire or tailing mechanism 34, 134, 234, 334 is then measured at step 1720 using the various techniques described above with respect to the adapter motor 38 and/or known tailing mechanism 34, 134, 234, 334 parameters. Next, the measured velocity of the pulling line 26 (tailing mechanism 34, 134, 234, 334) is compared to a maximum velocity at step 1740, which may be a predetermined or fixed value corresponding to various environment parameters. This is a safety feature so as to avoid possible damage to the electrical cable or wire. If the velocity of the pulling line 26 (tailing mechanism 34, 134, 234, 334) is greater than or equal or the maximum velocity 1742, the current/torque applied to the adapter motor 38 is slightly decreased at step 1746, and the controller 44 waits for a small amount of settling time, for example, 50 milliseconds.

However, if the velocity of the electrical cable or wire (tailing mechanism 34, 134, 234, 334) is below the maximum velocity 1750, the velocity of the electrical cable or wire (tailing mechanism 34, 134, 234, 334) is compared at step 1760 to the previous velocity measurement to see if the velocity of the electrical cable or wire (tailing mechanism 34, 134, 234, 334) has decreased. If the velocity of the electrical cable or wire (tailing mechanism 34, 134, 234, 334) has decreased 1762, the cable pulling system branches back to step 1716 where the current/torque applied to the adapter motor 38 is increased.

Referring back to step 1746, after the current/torque has been slightly decreased, the velocity of the electrical cable or wire (tailing mechanism 34, 134, 234, 334) is then measured at step 1770 again (as is similar to step 1720). Next, the measured velocity of the electrical cable or wire (tailing mechanism 34, 134, 234, 334) is compared at step 1776 to the previous velocity measurement to see if the velocity has increased.

If the velocity has increased 1780, indicating that the previous reduction in current/torque did not yet have the intended effect of reducing the velocity of the electrical cable or wire (tailing mechanism 34, 134, 234, 334), the cable pulling system branches back to step 1746 to again incrementally reduce the current/torque applied to the adapter motor 38. If, however, the velocity of the electrical cable or wire (tailing mechanism 34, 134, 234, 334) has not increased 1782, the cable pulling system branches back to step 1716 to again incrementally increase the current/torque applied to the adapter motor 38.

The back and forth modulation of the current/torque applied to the adapter motor 38 by increasing current/torque in step 1716 and by decreasing current/torque in step 1746, respectively, is referred to as "dithering." Such dithering is intended to maximize the velocity of the electrical cable or wire (tailing mechanism 34, 134, 234, 334) so as to maintain the cable velocity at the peak 826 of the curves shown in FIG. 16. The above-described steps 1700 are repeated in a continuous loop to "dither" the current/torque applied to the adapter motor 38 so as to maximize the cable velocity, until the cable pulling system is shut down.

In an embodiment, the tailing force provided by the tailing mechanism 34, 134, 234, 334 is directly controlled by the operator adjusting the torque applied to the tail by the tailing mechanism 34, 134, 234, 334. In an embodiment, the cable puller adapter 20, 120, 220, 320 has a control pendant 400 or controls, which may include a dial 1526, on the cable puller adapter 20, 120, 220, 320 which can be operated by the operator to control the torque. Suitable sensors may be provided to indicate the amount of torque being applied to the tailing mechanism 34, 134, 234, 334 so that the operator can make a decision whether to reduce or increase the torque.

Figure 14:
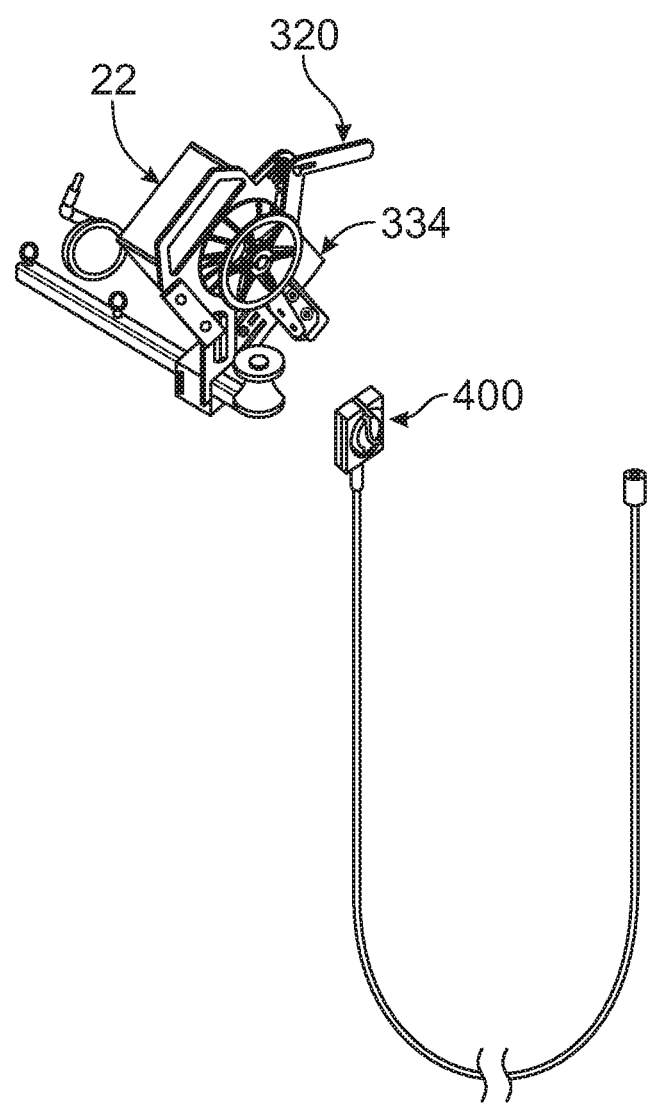
FIG. 14 depicts a perspective view of a wired pendant or hand-held controller used in conjunction with the cable puller adapter shown in FIG. 9.

FIG. 14 shows an alternate embodiment of a hand-held, wired, or wireless controller, which may be in the form of a pendant 400, which may communicate with the cable pulling system or the cable puller adapter 20, 120, 220, 320. Some or all of the functions described above with respect to the cable pulling system and the cable puller adapter 20, 120, 220, 320 may be alternately included in the illustrated pendant 400 rather than being fixedly mounted on structural portions of the cable pulling system, the cable puller adapter 20, 120, 220, 320, or housings associated therewith.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A cable puller adapter for operative engagement with a cable puller having a rotatable motor-driven capstan that provides a pulling force on a pulling line, the cable puller adapter comprising:
   an adapter frame;
   an adapter motor mounted on the adapter frame; and
   a rotatable gripping member mounted on the adapter frame, wherein the gripping member is rotatably driven by the adapter motor and grips and guides a tailing portion of the pulling line received from the capstan, wherein the gripping member is a pulley having a groove therein in which the tailing portion of the pulling line is configured to seat, wherein a plurality of teeth are provided in the groove which are configured to grip the tailing portion of the pulling line.

2. The cable puller adapter of claim 1, wherein the groove is generally V-shaped.

3. The cable puller adapter of claim 1, further comprising a spring-loaded lever arm mounted on the adapter frame, wherein an end of the lever arm is normally biased into the groove.

4. The cable puller adapter of claim 1, further comprising an extraction guide configured to engage the tailing portion of the pulling line and route the tailing portion of the pulling line away from the pulley.

5. The cable puller adapter of claim 4, wherein the extraction guide includes a ramped surface.

6. The cable puller adapter of claim 4, wherein the extraction guide includes a front end that seats within and substantially fills the groove.

7. The cable puller adapter of claim 6, wherein the extraction guide is movably attached to the adapter frame.

8. A cable puller adapter for operative engagement with a cable puller having a rotatable motor-driven capstan that provides a pulling force on a pulling line, the cable puller adapter comprising:
   an adapter frame;
   an adapter motor mounted on the adapter frame; and
   a rotatable gripping member mounted on the adapter frame, wherein the gripping member is rotatably driven by the adapter motor and grips and guides a tailing portion of the pulling line received from the capstan, wherein the gripping member is a pulley having a groove therein in which the tailing portion of the pulling line is configured to seat; and
   a spring-loaded lever arm mounted on the adapter frame, wherein an end of the lever arm is normally biased into the groove and into engagement with the tailing portion of the pulling line.

9. The cable puller adapter of claim 8, wherein the lever arm includes a handle external to the groove which can be gripped to bias the end of the lever arm out of the groove.

10. The cable puller adapter of claim 8, further comprising an extraction guide configured to engage the tailing portion of the pulling line and route the tailing portion of the pulling line away from the pulley.

11. The cable puller adapter of claim 10, wherein the extraction guide includes a front end that seats within and substantially fills the groove and the extraction guide is movably attached to the adapter frame.

12. A cable puller adapter for operative engagement with a cable puller having a rotatable motor-driven capstan that provides a pulling force on a pulling line, the cable puller adapter comprising:
   an adapter frame;
   an adapter motor mounted on the adapter frame; and
   a rotatable gripping member mounted on the adapter frame, wherein the gripping member is rotatably driven by the adapter motor and grips and guides a tailing portion of the pulling line received from the capstan, wherein the gripping member is a pair of rollers that grip the tailing portion of the pulling line, and a first one of the rollers can be moved toward a second one of the rollers to grip the tailing portion of the pulling line and can be moved away from the second one of the rollers to release the tailing portion of the pulling line.

13. A cable puller adapter for operative engagement with a cable puller having a rotatable motor-driven capstan that provides a pulling force on a pulling line, the cable puller adapter comprising:
an adapter frame;
an adapter motor mounted on the adapter frame; and
a rotatable gripping member mounted on the adapter frame, wherein the gripping member is rotatably driven by the adapter motor and grips and guides a tailing portion of the pulling line received from the capstan, wherein the gripping member is a first set of spaced apart rollers having a first endless belt wrapped therearound, and a second set of spaced apart rollers having a second endless belt wrapped therearound, wherein the tailing portion of the pulling line is gripped between the belts.

14. The cable puller adapter of claim 13, wherein the second set of rollers can be moved toward the first set of rollers to grip the tailing portion of the pulling line and the second set of rollers can be moved away from the first set of rollers to release the tailing portion of the pulling line.

15. The cable puller adapter of claim 1, further comprising:
a controller operatively coupled to the gripping member;
the controller configured to measure an amount of current drawn by or provided to the adapter motor, and configured to determine a rotational speed of the adapter motor or the gripping member; and
the controller configured to adjust a tailing force on a tailing portion of the pulling line by modulating an amount of current provided to the adapter motor, so as to maximize a velocity of the tailing portion of the pulling line as the gripping member rotates.

16. The cable puller adapter of claim 15, wherein the controller determines the tailing force on the tailing portion based on an amount of current drawn by the adapter motor or the controller determines the velocity of the tailing portion of the pulling line based on rotation of the adapter motor or the gripping member.

17. The cable puller adapter of claim 15, wherein the controller determines the velocity of the tailing portion of the pulling line based on a sensor, an encoder, or Hall effect device, in operative communication with the adapter motor or the gripping member.

18. The cable puller adapter of claim 15, wherein the controller controls the tailing force applied to the tailing portion of the pulling line by adjusting an amount of torque applied to the gripping member by the adapter motor.

19. The cable puller adapter of claim 15, wherein the velocity of the tailing portion of the pulling line is equivalent to a tangential velocity of the gripping member, and wherein the tailing portion of the pulling line does not slip relative to the gripping member as the gripping member rotates.

20. A method for controlling a cable puller adapter, the cable puller adapter arranged in operative engagement with a cable puller having a rotatable motor-driven capstan that provides a pulling force on a pulling line, the method comprising:
determining an amount of tailing force on a tailing portion of the pulling line coupled between the capstan and a rotatable motor-driven gripping member of the cable puller adapter;
determining a velocity of the tailing portion of the pulling line coupled between the capstan and the motor-driven gripping member; and
continuously adjusting the tailing force applied to the tailing portion of the pulling line so as to maximize the velocity of the tailing portion of the pulling line as the motor-driven gripping member rotates.

21. The method of claim 20, wherein the tailing force on the tailing portion is determined based on an amount of current drawn by an adapter motor that drives the motor-driven gripping member.

22. The method of claim 20, wherein the velocity of the tailing portion of the pulling line is determined based mechanical rotation of the gripping member.

23. The method of claim 20, wherein the velocity of the tailing portion of the pulling line is determined based on a sensor, an encoder, or Hall effect device, in operative communication with a rotating portion of the cable puller adapter.

24. The method of claim 20, wherein the tailing force applied to the tailing portion of the pulling line is controlled by an amount of torque applied to the motor-driven gripping member by an adapter motor.

25. The method of claim 24, wherein the tailing force applied to the tailing portion of the pulling line is adjusted by changing an amount of current provided to the adapter motor.

26. The method of claim 20, wherein the velocity of the tailing portion of the pulling line is equivalent to a tangential velocity of the motor-driven gripping member, and wherein the tailing portion of the pulling line does not slip relative to the motor-driven gripping member.

27. The method of claim 20, wherein the tailing force applied to the tailing portion of the pulling line is dithered about a tension value so as to maximize the velocity of the tailing portion of the pulling line.

28. The cable puller adapter of claim 8, further comprising:
a controller operatively coupled to the gripping member;
the controller configured to measure an amount of current drawn by or provided to the adapter motor, and configured to determine a rotational speed of the adapter motor or the gripping member; and
the controller configured to adjust a tailing force on a tailing portion of the pulling line by modulating an amount of current provided to the adapter motor, so as to maximize a velocity of the tailing portion of the pulling line as the gripping member rotates.

29. The cable puller adapter of claim 28, wherein the controller determines the tailing force on the tailing portion based on an amount of current drawn by the adapter motor or the controller determines the velocity of the tailing portion of the pulling line based on rotation of the adapter motor or the gripping member, and the controller controls the tailing force applied to the tailing portion of the pulling line by adjusting an amount of torque applied to the gripping member by the adapter motor.

30. The cable puller adapter of claim 12, further comprising:
a controller operatively coupled to the gripping member;
the controller configured to measure an amount of current drawn by or provided to the adapter motor, and configured to determine a rotational speed of the adapter motor or the gripping member; and
the controller configured to adjust a tailing force on a tailing portion of the pulling line by modulating an amount of current provided to the adapter motor, so as to maximize a velocity of the tailing portion of the pulling line as the gripping member rotates.

31. The cable puller adapter of claim 30, wherein the controller determines the tailing force on the tailing portion based on an amount of current drawn by the adapter motor or the controller determines the velocity of the tailing portion of the pulling line based on rotation of the adapter motor or the gripping member, and the controller controls the tailing force applied to the tailing portion of the pulling line by adjusting an amount of torque applied to the gripping member by the adapter motor.

32. The cable puller adapter of claim 13, further comprising:
  a controller operatively coupled to the gripping member;
  the controller configured to measure an amount of current drawn by or provided to the adapter motor, and configured to determine a rotational speed of the adapter motor or the gripping member; and
  the controller configured to adjust a tailing force on a tailing portion of the pulling line by modulating an amount of current provided to the adapter motor, so as to maximize a velocity of the tailing portion of the pulling line as the gripping member rotates.

33. The cable puller adapter of claim 32, wherein the controller determines the tailing force on the tailing portion based on an amount of current drawn by the adapter motor or the controller determines the velocity of the tailing portion of the pulling line based on rotation of the adapter motor or the gripping member, and the controller controls the tailing force applied to the tailing portion of the pulling line by adjusting an amount of torque applied to the gripping member by the adapter motor.

* * * * *